(12) United States Patent
Kuroda

(10) Patent No.: US 12,479,662 B2
(45) Date of Patent: Nov. 25, 2025

(54) AUTOMATED WAREHOUSE

(71) Applicant: Murata Machinery, Ltd., Kyoto (JP)

(72) Inventor: Shinjiro Kuroda, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 382 days.

(21) Appl. No.: 18/024,297

(22) PCT Filed: Aug. 3, 2021

(86) PCT No.: PCT/JP2021/028800
§ 371 (c)(1),
(2) Date: Mar. 2, 2023

(87) PCT Pub. No.: WO2022/049972
PCT Pub. Date: Mar. 10, 2022

(65) Prior Publication Data
US 2023/0312247 A1 Oct. 5, 2023

(30) Foreign Application Priority Data
Sep. 4, 2020 (JP) .................................. 2020-149188

(51) Int. Cl.
*B65G 1/04* (2006.01)
*B65G 1/137* (2006.01)

(52) U.S. Cl.
CPC ......... *B65G 1/0492* (2013.01); *B65G 1/1373* (2013.01)

(58) Field of Classification Search
CPC .. B65G 1/0492; B65G 1/0435; B65G 1/1373; B65G 2203/042
See application file for complete search history.

(56) References Cited

U.S. PATENT DOCUMENTS

2016/0016732 A1* 1/2016 Koide .................. B65G 1/137
414/807
2018/0339858 A1* 11/2018 Iwata .................. B65G 1/0435
(Continued)

FOREIGN PATENT DOCUMENTS

| JP | H04-192006 A | 7/1992 |
| JP | 2002-114317 A | 4/2002 |

(Continued)

OTHER PUBLICATIONS

Extended European Search Report dated Jul. 31, 2024, of counterpart European Patent Application No. 21864030.8.
(Continued)

*Primary Examiner* — Kaitlin S Joerger
(74) *Attorney, Agent, or Firm* — DLA Piper LLP (US)

(57) ABSTRACT

Reducing the time necessary for transferring a package from a shelf to a cart, when unloading an package, a conveyance controller of a moving cart performs control including: measuring width of the unloading package using first or second package detection sensors disposed on a front side of the moving cart in traveling direction when performing an unloading travel to a position corresponding to a placed position of the unloading package on a shelf; moving a second arm based on a measurement result of the width of the unloading package to adjust arm distance between a first and the second arm to distance larger than the width of the unloading package by a predetermined amount, and pulling in the unloading package after the moving cart reaches the position corresponding to the placed position of the unloading package, by extending and retracting the first and second arms while keeping adjusted arm distance.

10 Claims, 24 Drawing Sheets

(56) References Cited

U.S. PATENT DOCUMENTS

| | | | |
|---|---|---|---|
| 2021/0237976 A1* | 8/2021 | Tsukamoto | B65G 1/1375 |
| 2023/0041684 A1* | 2/2023 | Nako | B65G 1/0492 |
| 2023/0183000 A1* | 6/2023 | Sebastian | B65G 1/12 |
| | | | 414/284 |
| 2023/0271779 A1* | 8/2023 | Siraisi | B65G 1/0492 |
| | | | 700/218 |
| 2024/0051745 A1* | 2/2024 | Tatemi | B65G 1/0435 |
| 2024/0286834 A1* | 8/2024 | Liu | B65G 1/0492 |

FOREIGN PATENT DOCUMENTS

| | | | |
|---|---|---|---|
| JP | 2005-047705 A | 2/2005 | |
| JP | 2005-187158 A | 7/2005 | |
| JP | 2005-219833 A | 8/2005 | |
| JP | 2008-024493 A | 2/2008 | |
| JP | 2008-044728 A | 2/2008 | |
| JP | 2009-113965 A | 5/2009 | |
| JP | 2012-012163 A | 1/2012 | |
| JP | 2013-184822 A | 9/2013 | |
| JP | 2013-237562 A | 11/2013 | |
| JP | 2016-023024 A | 2/2016 | |
| JP | 2018-016434 A | 2/2018 | |
| JP | 2019-104588 A | 6/2019 | |
| WO | 2009/098573 A1 | 8/2009 | |

OTHER PUBLICATIONS

International Search Report dated Oct. 19, 2021 in counterpart International Application No. PCT/JP2021/028800 w/English translation.
Written Opinion dated Oct. 19, 2021 in counterpart International Application No. PCT/JP2021/028800.

* cited by examiner

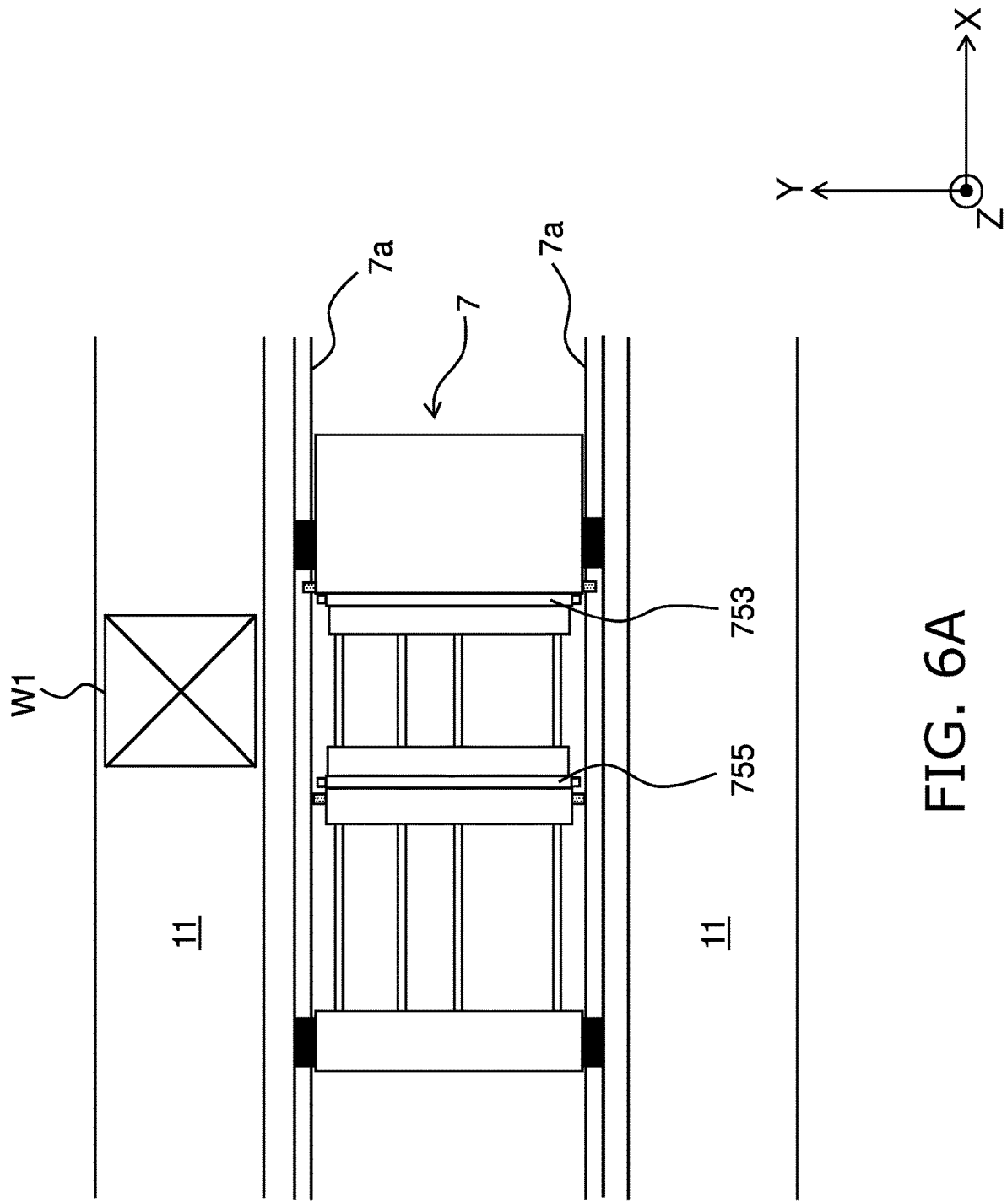

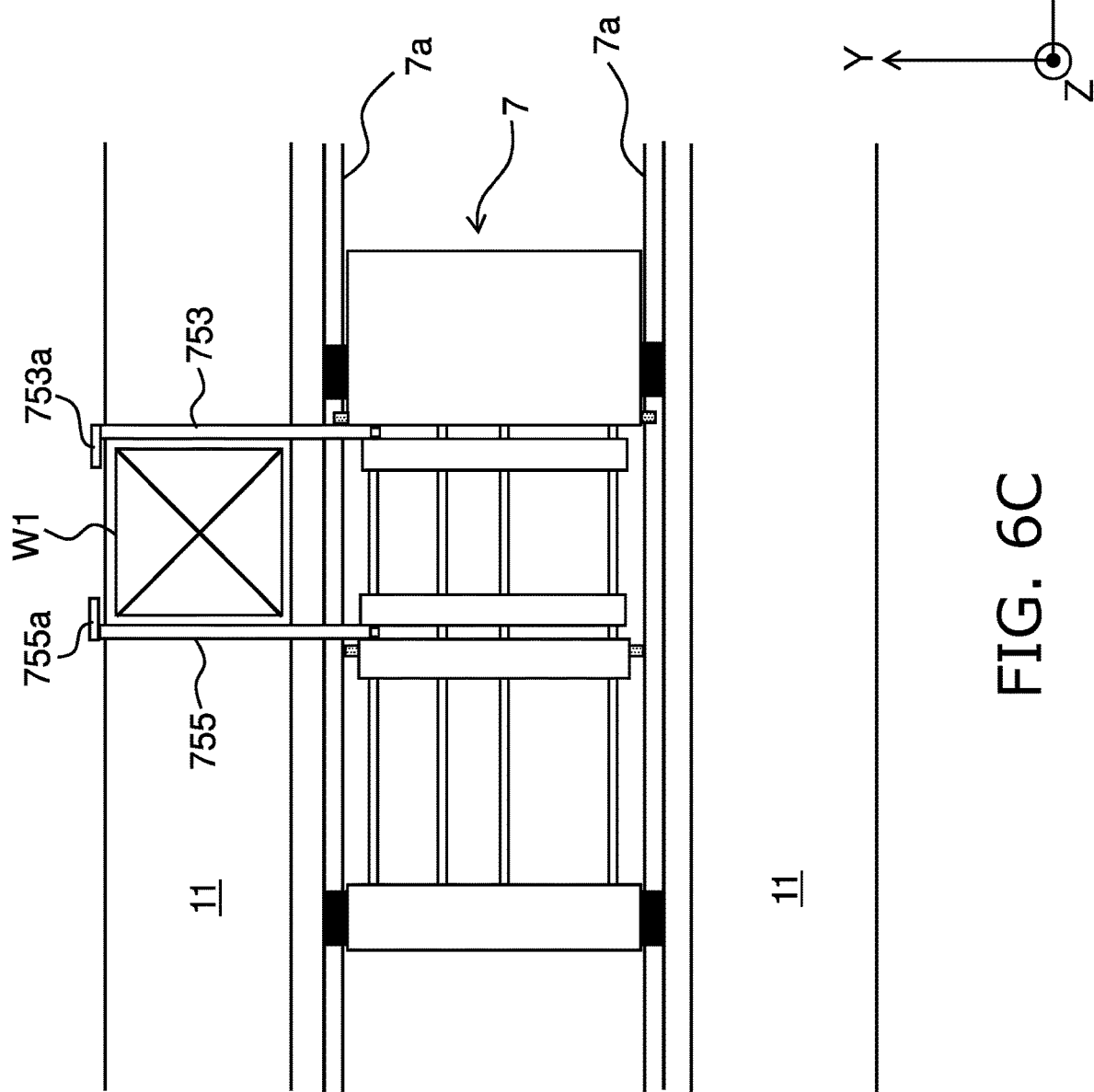

AUTOMATED WAREHOUSE

TECHNICAL FIELD

This disclosure relates to an automated warehouse including a plurality of shelves, a cart provided for each of the shelves to include a transfer device configured to transfer a package from and to the shelf using a pair of arms.

BACKGROUND

Conventionally, there is known an automated warehouse including a plurality of shelves, a cart provided for each of the shelves to include a transfer device configured to transfer a package from and to the shelf using a pair of arms. In addition, it is known, in this automated warehouse, to detect two ends of the package to be transferred using a sensor provided to the cart, and to calculate width of a package to be transferred based on a detection result of the ends of the package (see, for example, JP-A-2013-237562).

When transferring the package from the shelf to the cart, the conventional automated warehouse performs the steps of: (i) extending a pair of arms toward the shelf in a state where the distance between the pair of arms is set larger than the width of the package to be transferred; (ii) sandwiching (clamping) the package to be transferred with the pair of arms and setting hooks provided to the pair of arms to a closed state, (iii) increasing the distance between the pair of arms by a predetermined amount from the clamping state to secure a clearance between the package and the arm, and (iv) pulling in the pair of arms to the cart side in the state of (iii) to transfer the package to the cart.

In the conventional automated warehouse that performs the steps (i) to (iv) described above, it takes time to transfer the package from the shelf to the cart, due to the steps (ii) and (iii) described above, i.e., increasing the distance between the pair of arms after clamping the package with the pair of arms.

It could therefore be helpful to reduce the time necessary for transferring the package from the shelf to the cart after stopping the cart, in the automated warehouse including the cart equipped with the transfer device configured to transfer the package from and to the shelf using the pair of arms.

SUMMARY

I thus provide:

An automated warehouse according to one example comprises a plurality of shelves, a cart provided for each of the shelves to travel in extending direction of the shelf to convey a package, and a subordinate controller configured to control the cart. The cart includes a transfer device, a first sensor, and a second sensor.

The transfer device has a first arm and a second arm configured to transfer a package from and to the shelf.

The first sensor is disposed on the first arm side to detect the package placed on the shelf.

The second sensor is disposed on the second arm side to detect the package placed on the shelf.

In the cart described above, at least one of the first arm and the second arm is configured to move in the extending direction of the shelf with respect to the cart.

In addition, when unloading the package, the subordinate controller configured to perform control including:

measuring width of an unloading package to be unloaded using the first sensor or the second sensor disposed on a front side of the cart in traveling direction of unloading travel, when the cart performs the unloading travel to a position corresponding to a placed position of the unloading package on the shelf;

moving the first arm and/or the second arm based on a measurement result of the width of the unloading package, to adjust arm distance between the first arm and the second arm to distance larger than the width of the unloading package by a predetermined amount; and pulling in the unloading package by extending and retracting the first arm and the second arm while keeping adjusted arm distance, after the cart reaches the position corresponding to the placed position of the unloading package.

In the automated warehouse described above, when unloading the package, the subordinate controller measures the width of the unloading package to be unloaded using the sensor disposed on the front side of the cart in the traveling direction, and adjusts the arm distance based on the measurement result to distance larger than the width of the unloading package by a predetermined amount. Furthermore, after the cart reaches the position corresponding to the placed position of the unloading package, the subordinate controller pulls in the unloading package by extending and retracting the first arm and the second arm while keeping the adjusted arm distance.

In this way, the arm distance is set before the cart reaches the transferring position, and afterward the arm distance is not changed. Therefore, it is possible to reduce the time necessary for transferring the package after stopping the cart. This is because, in the conventional method, when unloading the unloading package, the arms are moved to sandwich the unloading package, and further the arms are moved again to secure a clearance between the package and the arm, but these operations are unnecessary.

The automated warehouse may further include a host controller. The host controller is configured to send to the subordinate controller a conveyance command including information about the width of the unloading package. In this example, when starting the unloading travel, the subordinate controller adjusts the arm distance to a first distance larger than a value indicated in the information about the width of the unloading package included in the conveyance command by a predetermined amount. After that, the subordinate controller adjusts and increases the arm distance from the adjusted first distance to distance larger than the width of the unloading package indicated in the measurement result by a predetermined amount.

The arm distance is adjusted to the first distance when starting the unloading travel. After that, from the adjusted first distance, the arm distance is adjusted to distance larger than the value indicated in the measurement result by a predetermined amount. Therefore, when adjusting the arm distance based on the measurement result, movement distance of the first arm and/or the second arm can be reduced.

By reducing the movement distance of the first arm and/or the second arm when adjusting the arm distance based on the measurement result, even if the time from end of measurement of the width of the unloading package to the stop of the cart is short, transferring of the unloading package can be performed promptly after the cart stops. The reason why is that time from completion of measurement of the width of the unloading package to completion of adjustment of the arm distance can be reduced by reducing the movement distance of the first arm and/or the second arm.

The second arm may be movable in the extending direction of the shelf and, the second sensor may be provided to the second arm. In this example, the subordinate controller is configured to measure the width of the unloading package based on information about cart position and information about second arm position on the cart, when the second sensor is on the front side of the cart in the traveling direction in the unloading travel.

In this way, if the second sensor provided to the moving second arm is on the front side in the traveling direction, i.e., if the width of the unloading package is measured using the second sensor whose position on the cart varies along with movement of the second arm, the width of the unloading package can be precisely measured considering position of the second sensor on the cart.

When the first sensor is on the front side of the cart in the traveling direction in the unloading travel, if a difference between the information about the width of the unloading package included in the conveyance command and the measurement result of the width of the unloading package is a first predetermined value or less, and if the placed position of the unloading package on the shelf is shifted from a predetermined position in the extending direction of the shelf, the subordinate controller may be configured to determine a stop position of the cart based on a shift amount of the unloading package from the predetermined position.

In this way, if the unloading package is placed on the shelf at a position shifted from an assumed position in the extending direction of the shelf, while the width of the unloading package is within an assumed range, it is possible to stop the cart at the stop position determined in consideration of the positional shift of the unloading package, and to accurately pull in the unloading package to the cart with the first arm and the second arm.

When the second sensor is on the front side of the cart in the traveling direction in the unloading travel, if the difference between the information about the width of the unloading package included in the conveyance command and the measurement result of the width of the unloading package is the first predetermined value or less, and if the placed position of the unloading package on the shelf is shifted from the predetermined position in the extending direction of the shelf, the subordinate controller may be configured to determine a position of the second arm on the cart based on the shift amount of the unloading package from the predetermined position.

In this way, if the unloading package is placed on the shelf at a position shifted from the assumed position in the extending direction of the shelf, while the width of the unloading package is within the assumed range, it is possible to move the second arm to the position determined in consideration of the positional shift of the unloading package, and accurately pull in the unloading package to the cart with the first arm and the second arm, without moving the cart corresponding to the shift amount.

If the difference between the information about the width of the unloading package included in the conveyance command and the measurement result of the width of the unloading package is more than the first predetermined value, the subordinate controller may be configured to control the cart to perform re-measurement of the width of the unloading package.

In this way, if the width of the unloading package is outside the assumed range, the re-measurement of the width of the unloading package is performed without instantly causing abnormal stop of the cart so that decrease of availability of carts in the automated warehouse can be prevented.

The first arm may be fixed to the cart on a first direction side that is one side in the extending direction of the shelf.

In this example, when performing the re-measurement of the width of the unloading package placed on the side closer to the first direction end of the shelf than a second direction side end that is the other side end in the extending direction of the shelf, the subordinate controller is configured to cause the cart to travel a first distance in the second direction from a second direction end side of the unloading package opposite to the first direction.

In this way, if the unloading package is placed on the side close to the first direction end in the extending direction of the shelf on the entire shelf, it is possible to perform the re-measurement of the width of the unloading package while avoiding further movement of the cart toward the first direction end of the shelf when performing re-measurement of the unloading package. As a result, it is not necessary to provide the travel route further on the first direction end side beyond the region in which the package can be placed on the shelf (the region corresponding to the travel route of the cart), for the re-measurement of the unloading package.

The first distance may be a distance corresponding to a distance at which the first sensor exists on the second direction side of the second direction side end of the unloading package when the cart is moved in the second direction. In this way, it is possible to securely detect two ends of the unloading package with the first sensor so that the width of the unloading package can be accurately measured in the re-measurement of the width of the unloading package.

The second arm may be mounted on the cart at the second direction side end in a movable manner in the extending direction of the shelf. In this example, when performing re-measurement of the width of the unloading package placed on the side close to the second direction end of the shelf, the subordinate controller is configured to cause the cart to travel sum of the information about the width of the unloading package included in the conveyance command and the first distance, from the first direction end side of the unloading package in the first direction.

In this way, if the unloading package is placed on the side close to the second direction end in the extending direction of the shelf on the entire shelf, the re-measurement of the width of the unloading package can be performed while avoiding further movement of the cart toward the second direction end of the shelf in the re-measurement of the unloading package. As a result, it is not necessary to provide the travel route further on the second direction end side beyond the region in which the package can be placed on the shelf (the region corresponding to the travel route of the cart), for the re-measurement of the unloading package.

It is thus possible to reduce the time necessary for transferring the package from the shelf to the cart in the transfer device that transfers the package from and to the shelf with a pair of arms.

BRIEF DESCRIPTION OF THE DRAWINGS

FIG. 6A is a diagram illustrating an example of a state where the moving cart has reached a position corresponding to a placed position of an unloading package.

FIG. 6C is a diagram illustrating an example of a state where hooks are operated.

Figure 1:
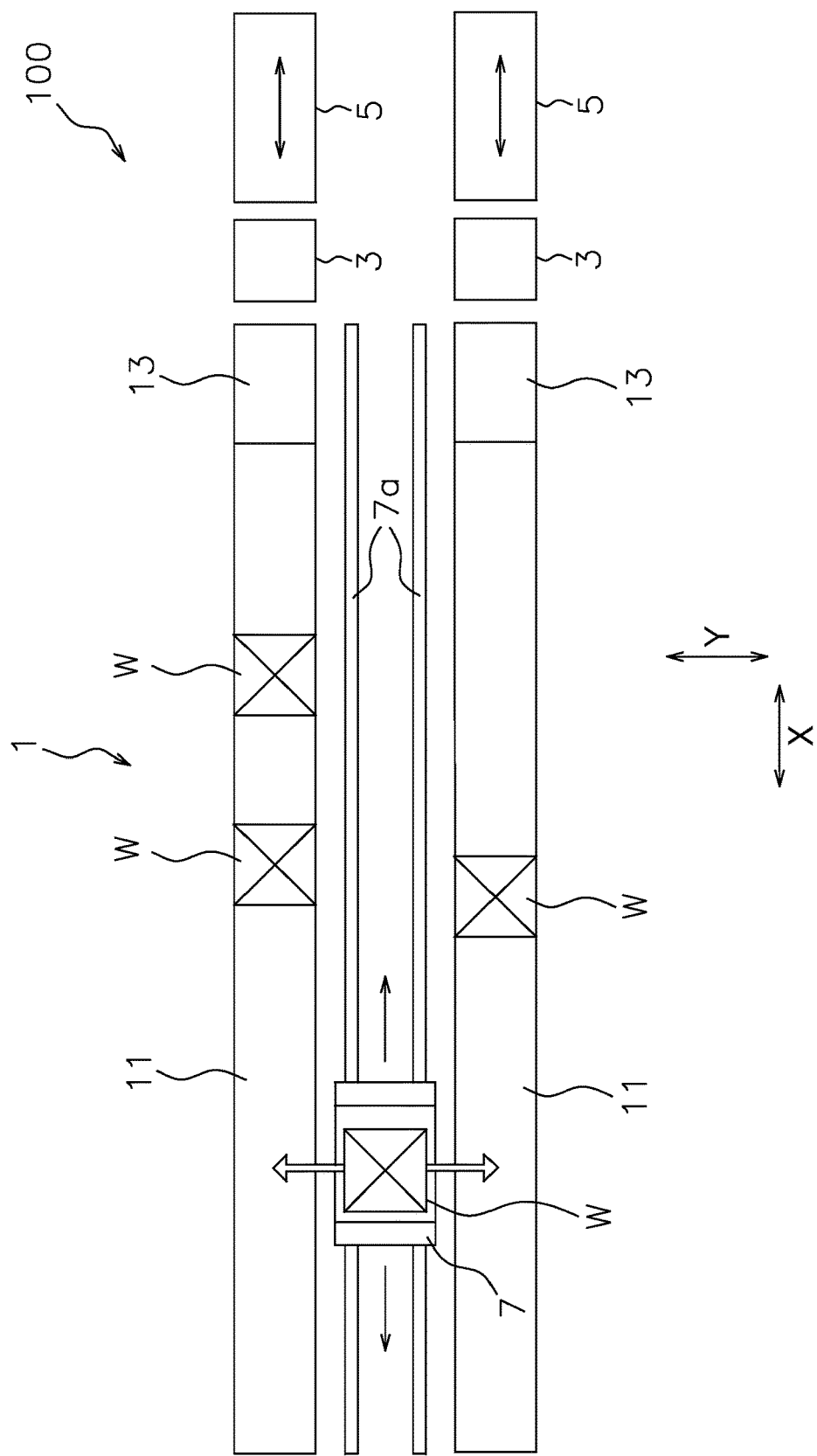
FIG. 1 is a top view of an automated warehouse.

REFERENCE SIGNS LIST 100 automated warehouse
1 rack
11 shelf
13 relay conveyor
3 lift conveyance device
5 loading/unloading station
7 moving cart
71 guide member
73a first main body part
731 wheel
731a first motor
731b first rotation amount measuring sensor
73b second main body part
733 driven wheel
75 transfer device
751 frame
751a second motor
751b second rotation amount measuring sensor
753 first arm
753a, 755a hook
755 second arm
757 placing member
76 ball screw
77 spline member
77a third motor
78 first package detection sensor
79 second package detection sensor
7a rail
7b slit detection sensor
51 host controller
53 conveyance controller
W package
W1 unloading package

DETAILED DESCRIPTION

1. First Example (1) Automated Warehouse

Figure 2:
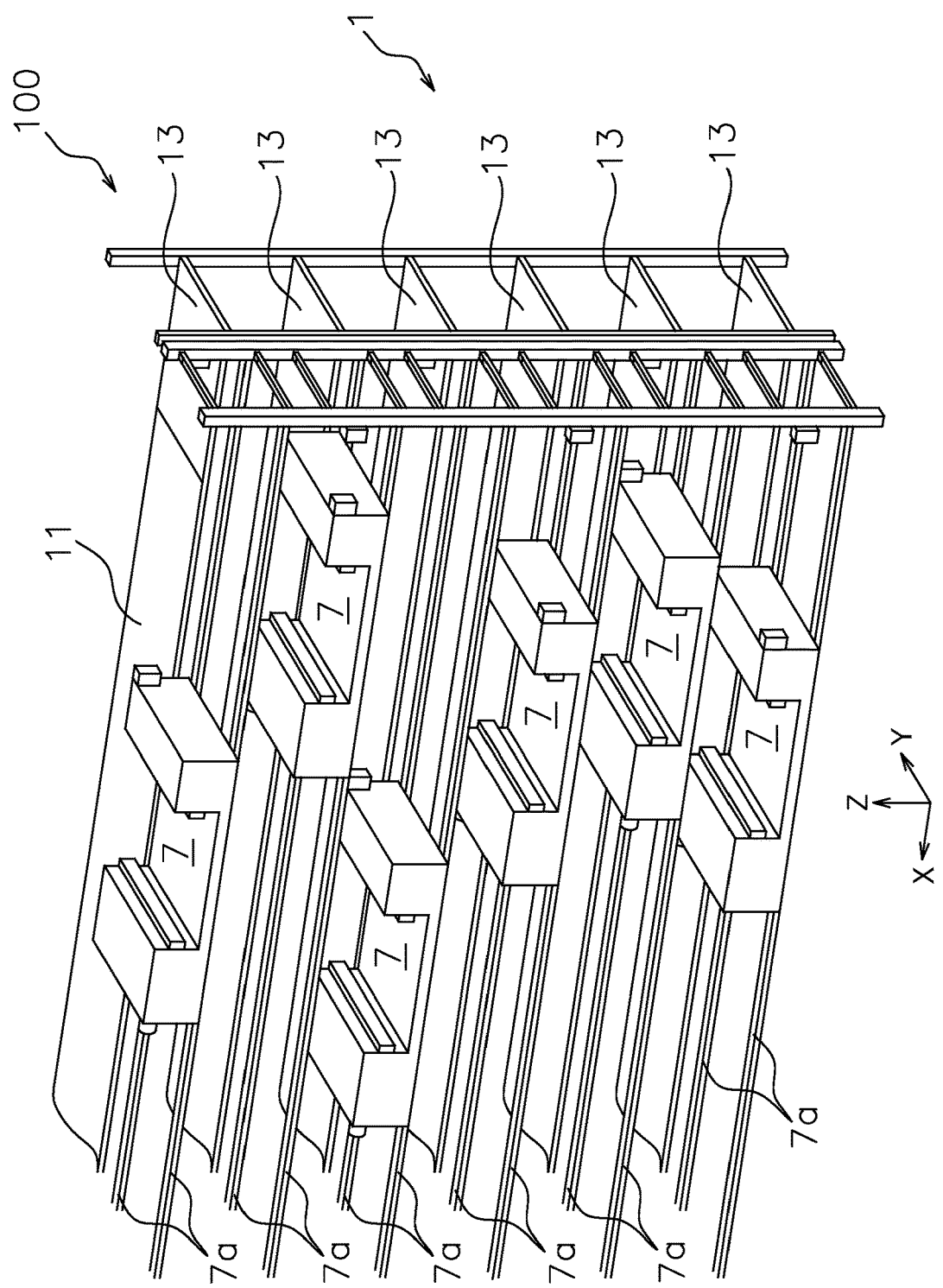
FIG. 2 is a perspective view of moving carts and a rack.

Hereinafter, with reference to FIGS. 1 and 2, an automated warehouse 100 equipped with moving carts 7 (an example of carts) according to a first example is described. FIG. 1 is a top view of the automated warehouse 100, and FIG. 2 is a perspective view of the moving carts 7 and a rack 1. In the following description, the left and right direction in FIG. 1 is referred to as an X direction, the up and down direction in FIG. 1, i.e., the direction perpendicular to the X direction in a horizontal direction is referred to as a Y direction, and the up and down direction in FIG. 2, which is perpendicular to the X direction and the Y direction, is referred to as a Z direction. The automated warehouse 100 includes the rack 1, a lift conveyance device 3, a loading/unloading station 5, a plurality of the moving carts 7 and rails 7a.

The rack 1 stores a package W. Specifically, the rack 1 includes a plurality of shelves 11. The plurality of shelves 11 extend in the X direction and arranged in the Z direction with predetermined spaces therebetween. In other words, the rack 1 comprises the plurality of shelves 11. The package W is placed and stored on one of the plurality of shelves 11.

In addition, each shelf 11 is provided with a relay conveyor 13. The relay conveyor 13 is disposed close to the lift conveyance device 3, and the package W to be loaded is transferred thereto from the lift conveyance device 3. In addition, the package W to be unloaded is transferred thereto from the moving cart 7.

In this example, as illustrated in FIG. 1, the rack 1 is disposed on each side of the moving cart 7 (the rails 7a) in the Y direction. Without limiting to this, however, the rack 1 may be disposed only on one side of the moving cart 7 (the rails 7a) in the Y direction.

The lift conveyance device 3 is disposed between the rack 1 and the loading/unloading station 5, and has a lift table. The lift table can move up and down in the Z direction while supporting a plurality of packages, on the lift conveyance device 3. For instance, the lift table has a conveyor configured to transfer the package W between the loading/unloading station 5 and the relay conveyor 13 of the rack 1.

The loading/unloading station 5 conveys the package W to be stored (put in) on the shelf 11 of the rack 1 from outside to vicinity of the lift conveyance device 3. In addition, the loading/unloading station 5 conveys the package W conveyed by the lift conveyance device 3 to outside for unloading. The loading/unloading station 5 is a conveyance device such as a belt conveyor, for example.

The rails 7a are provided to each shelf 11 of the rack 1 and extend in the X direction. The moving cart 7 provided to each shelf 11 is guided by the rails 7a provided to the corresponding shelf 11, to travel in the extending direction of the shelf 11 (in the X direction). It should be noted that the rails 7a are provided with slits along the extending direction (the X direction) of the rails 7a. The slits are detected by a slit detection sensor 7b (FIG. 4) provided to the moving cart 7. The slit detection sensor 7b is a photoelectric sensor or the like, for example.

(2) Moving Cart (2-1) Schematic Description of Moving Cart

The moving cart 7 travels in the X direction at a height corresponding to a height of each shelf 11. The moving cart 7 travels with guide by the rails 7a extending in the X direction at the height corresponding to each shelf 11, to travel in the X direction. In addition, the moving cart 7 has a transfer device 75 (FIG. 3) configured to transfer the package W from and to the relay conveyor 13 of the rack 1, and from and to the shelf 11.

With the structure described above, the moving cart 7 holds the package W and in this state travels along the shelf 11 in the X direction so that the held package W can be conveyed in the X direction. In addition, using the transfer device provided to the moving cart 7, the package W can be transferred between the moving cart 7 and the relay conveyor 13, and between the moving cart 7 and the shelf 11.

Specifically, when loading the package W, the package W transferred from the lift conveyance device 3 to the relay conveyor 13 is transferred to the moving cart 7, and then the moving cart 7 moves to a target position on the shelf 11 in the X direction, and at this target position, the package W is transferred from the moving cart 7 to the shelf 11.

On the other hand, when performing unloading, the moving cart 7 travels to the target position corresponding to the placed position of the package W to be unloaded (referred to as an unloading package W1) on the shelf 11 (this travel is referred to as unloading travel), to transfer the package W from the shelf 11 to the moving cart 7 at the target position. After that, the moving cart 7 moves to a position of the relay conveyor 13 in the X direction so that the package W is transferred from the moving cart 7 to the relay conveyor 13.

(2-2) Detailed Description of Moving Cart

Figure 3:
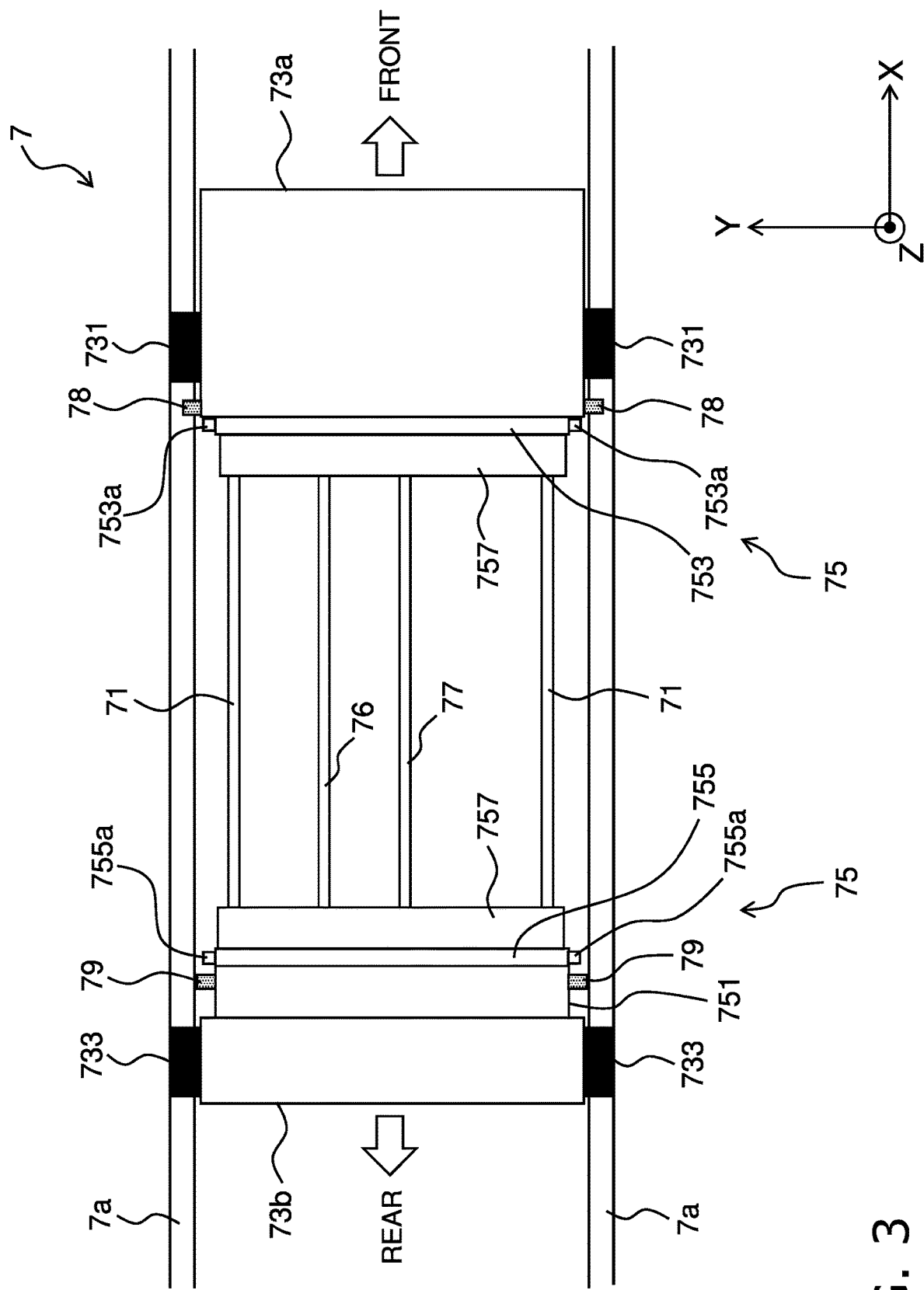
FIG. 3 is a top view of the moving cart.

Hereinafter, with reference to FIG. 3, a structure of the moving cart 7 according to the first example is described in detail. FIG. 3 is a top view of the moving cart 7. In the following description, the right side in FIG. 3 is defined as a positive direction of the X-axis (the X-axis arrow direction in FIG. 3), and the opposite side is defined as a negative direction of the X-axis. In addition, the positive direction side of the X-axis of the moving cart 7 is defined as a front side of the moving cart 7, and the negative direction side of the X-axis of the moving cart 7 is defined as a rear side of the moving cart 7. The moving cart 7 is equipped with a pair of guide members 71, a first main body part 73a, a second main body part 73b, and the transfer device 75.

The pair of guide members 71 are disposed with a predetermined space therebetween in the Y direction and are elongated in the X direction, and guides movement of a frame 751 (a second arm 755) of the transfer device 75.

The first main body part 73a is disposed at an end of the pair of guide members 71 on the positive direction side of the X-axis, and constitutes a main body on the positive direction side of the moving cart 7 in the X direction. Both ends of the first main body part 73a in the Y direction are equipped with wheels 731, respectively. The wheels 731 rotate with rotation of a first motor 731a (FIG. 4), and causes the moving cart 7 to travel along the rails 7a. The first motor 731a is provided with a first rotation amount measuring sensor 731b (FIG. 4) configured to measure rotation amount of the wheels 731. The first rotation amount measuring sensor 731b is an encoder, for example.

The second main body part 73b is disposed at an end of the pair of guide members 71 on the negative direction side in the X direction, and constitutes a main body on the negative direction side of the moving cart 7 in the X direction. Both ends of the second main body part 73b in the Y direction are equipped with driven wheels 733, respectively. The driven wheels 733 rotate on the rails 7a when the moving cart 7 travels.

(2-3) Detailed Description of Transfer Device

The transfer device 75 is a device configured to transfer the package W between the moving cart 7 and the relay conveyor 13, and between the moving cart 7 and the shelf 11. In this example, the transfer device 75 is disposed between the first main body part 73a and the second main body part 73b on the pair of guide members 71 of the moving cart 7. The transfer device 75 includes the frame 751, a first arm 753, the second arm 755, and a pair of placing members 757.

The frame 751 is provided in a slidable manner along the pair of guide members 71 in the X direction between the first main body part 73a and the second main body part 73b. Specifically, the frame 751 is engaged with a ball screw 76 having a thread formed along substantially the entire length in the X direction. The moving cart 7 is provided with a second motor 751a (FIG. 4) configured to rotate the ball screw 76. When the second motor 751a (FIG. 4) rotates the ball screw 76, the frame 751 can move in the X direction (the extending direction of the shelf 11).

The second motor 751a is provided with a second rotation amount measuring sensor 751b (FIG. 4) configured to measure rotation amount of the ball screw 76. The second rotation amount measuring sensor 751b is an encoder, for example.

The first arm 753 extends and retracts in the Y direction with respect to the first main body part 73a along an arm rail (not shown) provided to the first main body part 73a. The first arm 753 is fixed to the first main body part 73a side (the front side of the moving cart 7) and cannot move in the X direction. The first arm 753 is provided with a member (not shown) engaging with a spline of a spline member 77 extending in the X direction. In addition, the moving cart 7 is provided with a third motor 77a (FIG. 4) configured to rotate the spline member 77. When the third motor 77a rotates the spline member 77, the first arm 753 can move (extend and retract) in the Y direction.

The first arm 753 can extend and retract in the positive direction of the Y-axis (the Y-axis arrow direction in FIG. 3) and also in the opposite direction, i.e., the negative direction. In this way, the transfer device 75 can transfer the package W from and to each of the shelves 11 disposed to sandwich the rails 7a.

Each end of the first arm 753 in the Y direction is provided with a hook 753a in a rotatable manner about an axis extending in the Y direction. When transferring the package W, the hook 753a rotates with respect to the first arm 753 to set its length direction in the X direction, and hooks the back of the package W. On the other hand, when not transferring the package W, the hook 753a sets its length direction in the Z direction as illustrated in FIG. 3.

The second arm 755 is provided to the frame 751, and moves in the X direction along with the movement of the frame 751 in the X direction. In other words, the second arm 755 can move in the X direction on the second main body part 73b side, i.e., on the rear side of the moving cart 7. The second arm 755 extends and retracts in the Y direction with respect to the frame 751 along the arm rail (not shown) provided to the frame 751. Similarly to the first arm 753, the second arm 755 is provided with a member (not shown) engaging with the spline of the spline member 77 extending in the X direction. For instance, when the spline member 77 is rotated by the third motor 77a (FIG. 4), the second arm 755 can move (extend and retract) in the Y direction, together with the first arm 753 described above.

Each end of the second arm 755 in the Y direction is provided with a hook 755a in a rotatable manner about an axis extending in the Y direction. When transferring the package W, the hook 755a rotates with respect to the second arm 755 to set its length direction in the X direction, and hooks the back of the package W. On the other hand, when not transferring the package W, the hook 755a sets its length direction in the Z direction as illustrated in FIG. 3.

One of the pair of placing members 757 is disposed on the first arm 753 side, and the other is disposed on the second arm 755 side, on the pair of guide members 71. The pair of placing members 757 are members configured to place the package W transferred to the transfer device 75.

When transferring the package W using the transfer device 75 having the structure described above, the second arm 755 is moved in the X direction based on the width of the package W to be transferred, to adjust the distance between the first arm 753 and the second arm 755 (referred to as an arm distance), and after that, the length directions of the hooks 753a and 755a are set in the X direction. In other words, the hooks 753a and 755a are set to a closed state. The package W is set between the first arm 753 and the second arm 755, the hooks 753a and 755a are set to the closed state, and both the first arm 753 and the second arm 755 are pulled into the transfer device 75 side so that the package W can be transferred.

(2-4) Package Detection Sensor

The moving cart 7 further includes sensors to measure the width of the unloading package W1 in the X direction when performing the unloading travel for the unloading package W1 to be unloaded from the shelf 11. Specifically, the moving cart 7 further includes a first package detection sensor 78 (an example of a first sensor) and a second package detection sensor 79 (an example of a second sensor) configured to detect the package W placed on the shelf 11.

The first package detection sensor 78 is disposed on the first arm 753 side. Specifically, the first package detection sensor 78 is attached at a position adjacent to the first arm 753 on the first main body part 73a. In this example, the first package detection sensor 78 is disposed at each end of the first main body part 73a in the Y direction, to detect the package W placed on each of the pair of shelves 11 disposed to sandwich the rails 7a.

The first package detection sensor 78 is an optical reflection type sensor such as a photoelectric sensor, for example.

The first package detection sensor 78 emits visual light or infrared light in the Y direction and receives reflection light from the package W to detect the package W. If the light does not hit the package W, the first package detection sensor 78 does not receive the reflection light.

The second package detection sensor 79 is disposed on the second arm 755 side. Specifically, the second package detection sensor 79 is attached at a position adjacent to the second arm 755 on the frame 751, and can move in the X direction together with the second arm 755. In this example, the second package detection sensor 79 is disposed at each end of the frame 751 in the Y direction, to detect the package W placed on each of the pair of shelves 11 disposed to sandwich the rails 7a.

The second package detection sensor 79 is an optical reflection type sensor such as a photoelectric sensor, for example. The second package detection sensor 79 emits visual light or infrared light in the Y direction and receives reflection light from the package W to detect the package W. If the light does not hit the package W, the second package detection sensor 79 does not receive the reflection light.

(3) Control Structure of Automated Warehouse

Figure 4:
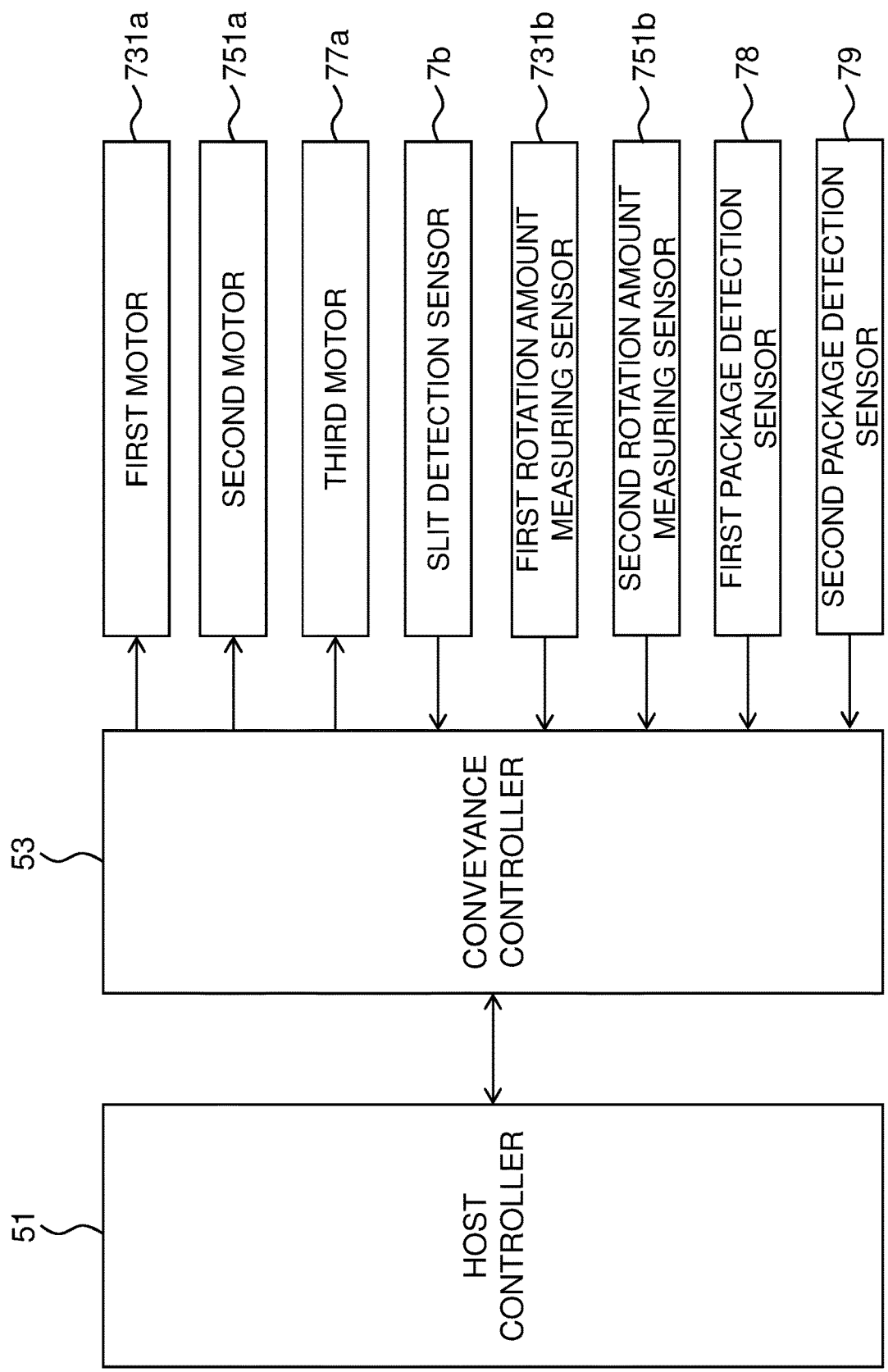
FIG. 4 is a functional block diagram illustrating a control structure of the automated warehouse.

With reference to FIG. 4, a control structure of the automated warehouse 100 is described. FIG. 4 is a functional block diagram illustrating the control structure of the automated warehouse 100. As illustrated in FIG. 4, the automated warehouse 100 includes a host controller 51 and a conveyance controller 53 (an example of a subordinate controller).

The host controller 51 is a controller configured to control loading and unloading of the package W in the automated warehouse 100. For instance, the host controller 51 sends to the conveyance controller 53 a conveyance command to command the moving cart 7 to convey the package W, based on a schedule for controlling loading and unloading of the package W. The conveyance command includes information about the width in the X direction of the package W to be loaded or unloaded, information about the placed position of the package W on the shelf 11, and the like.

The host controller 51 is a computer system including a processor (e.g., a CPU), a storage device (e.g., a ROM, a RAM, an HDD, or an SSD), and a various interface (e.g., an A/D converter, a D/A converter, a communication interface). The host controller 51 may execute a program stored in a storage unit (corresponding to a part or the whole of storage region of the storage device), to perform control operations of individual portions, or a part of the control operations may be realized by hardware included in the controller.

The host controller 51 may be realized by a single computer system or separate computer systems.

The conveyance controller 53 is a device provided to each moving cart 7 and configured to control the moving cart 7 based on the conveyance command from the host controller 51. The host controller 51 and the conveyance controller 53 communicate with each other via wireless communication. The conveyance controller 53 is connected to the first motor 731a of the moving cart 7, the second motor 751a of the transfer device 75, and the third motor 77a of the transfer device 75. The conveyance controller 53 can control these motors based on the conveyance command.

In addition, the conveyance controller 53 is connected to the slit detection sensor 7b and the first rotation amount measuring sensor 731b. The conveyance controller 53 can receive output signals from these sensors. The conveyance controller 53 grasps the position of the moving cart 7 in the X direction, based on a detection result of the slit detected by the slit detection sensor 7b and the rotation amount of the wheels 731 measured by the first rotation amount measuring sensor 731b.

The conveyance controller 53 is connected to the second rotation amount measuring sensor 751b. The conveyance controller 53 can receive an output signal from the second rotation amount measuring sensor 751b. The conveyance controller 53 grasps the position of the frame 751 (the second arm 755) on the moving cart 7, based on the rotation amount of the ball screw 76 measured by the second rotation amount measuring sensor 751b.

The conveyance controller 53 is connected to the first package detection sensor 78 and the second package detection sensor 79. The conveyance controller 53 can receive output signals from these sensors. The conveyance controller 53 calculates the width of the package W, based on a detection result of the package W by the first package detection sensor 78 or the second package detection sensor 79 and the position of the moving cart 7 in the X direction.

The conveyance controller 53 is a computer system including a processor (e.g., a CPU), a storage device (e.g., a ROM, a RAM, an HDD, an SSD, and the like), and a various interface (e.g., an A/D converter, a D/A converter, a communication interface and the like). The conveyance controller 53 may execute a program stored in a storage unit (corresponding to a part or the whole of storage region of the storage device), to perform control operations, or a part of the control operations may be realized by hardware included in the controller.

The conveyance controller 53 may be realized by a single computer system or separate computer systems.

Although not illustrated, the control structure of the automated warehouse 100 described above includes individual controllers configured to connect and control the lift conveyance device 3 and the loading/unloading station 5. In addition, although not illustrated, the host controller 51 and/or the conveyance controller 53 are also connected to other sensor, switch, and an information input device configured to detect states of devices.

The conveyance controller 53 may not be provided to the moving cart 7 but may be a computer system separated from the moving cart 7. For example, it may be possible that the motor controller configured to control the first motor 731a, the second motor 751a, and the third motor 77a is provided to the moving cart 7, and that the conveyance controller 53 is configured to perform signal communication with the motor controller and the sensors of the moving cart 7 via wireless communication.

(4) Operation of Automated Warehouse (4-1) Unloading Operation of Package

Figure 5:
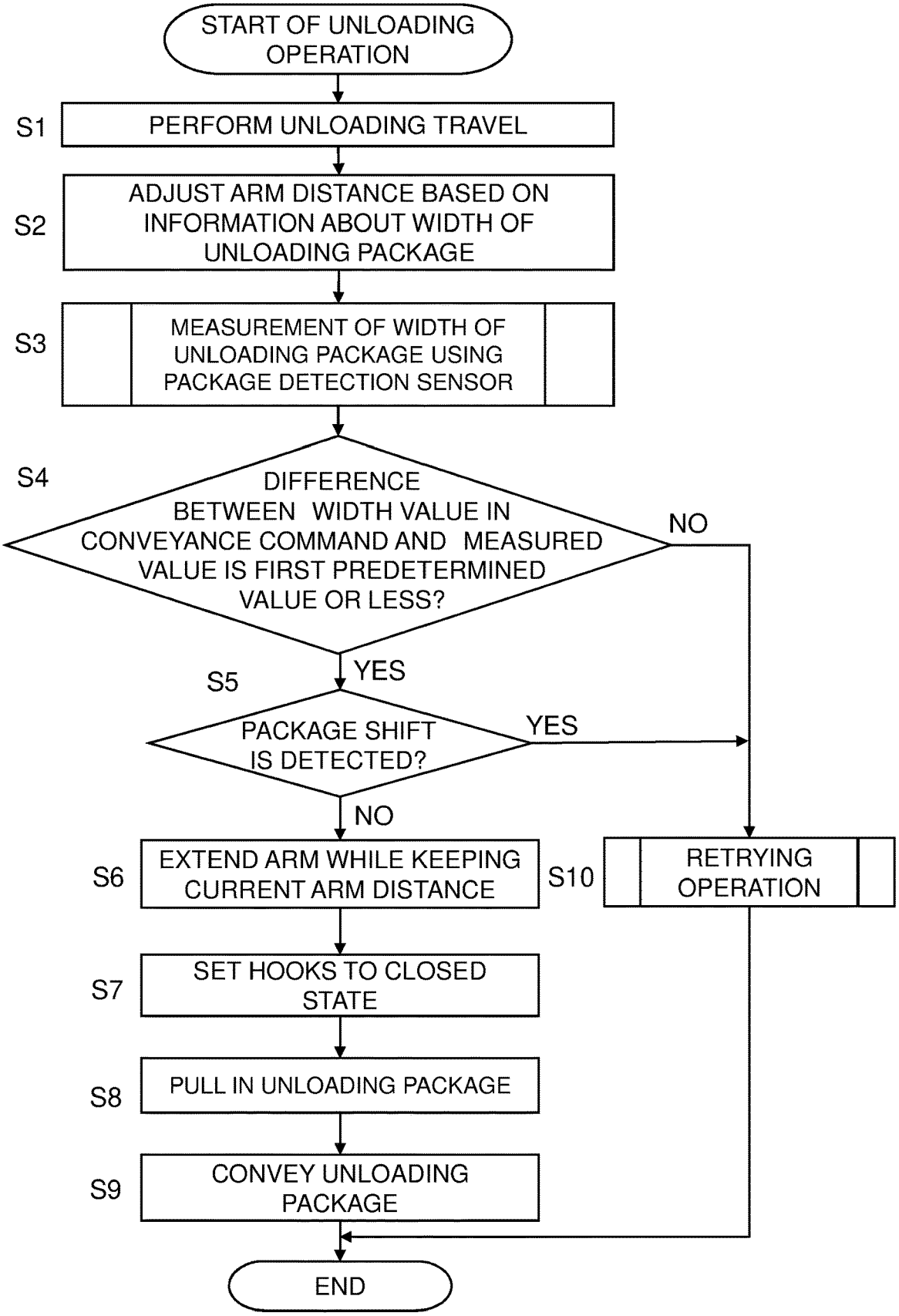
FIG. 5 is a flowchart illustrating a unloading operation of a package.

With reference to FIG. 5, a unloading operation of the package W in the automated warehouse 100 having the above structure is described. FIG. 5 is a flowchart illustrating the unloading operation of the package W. When the conveyance command to perform unloading of the package W is sent from the host controller 51 to the conveyance controller 53 of the moving cart 7 provided to the shelf 11, on which the unloading package W1 is placed, the moving cart 7 starts the unloading operation.

When the unloading operation is started, in Step S1 the conveyance controller 53 causes the moving cart 7 to perform the unloading travel to the position corresponding to the placed position of the unloading package W1 on the shelf 11. This position corresponding to the placed position of the unloading package W1 on the shelf 11, which was the stop position of the moving cart 7 when the unloading package W1 was stored, is determined by a positional relationship between a position in the X direction of the first arm 753 (the first package detection sensor 78) and the positive direction side end in the X direction of the unloading package W1.

When starting the unloading travel, the conveyance controller 53 that received the conveyance command moves the second arm 755 in the X direction in Step S2, to change the arm distance between the first arm 753 and the second arm 755, based on the information about the width of the unloading package W1 included in the received conveyance command.

Specifically, the conveyance controller 53 moves the second arm 755 so that the arm distance becomes larger than a value indicated in the information about the width of the unloading package W1 by a predetermined amount. For instance, the information about the width of the unloading package W1 may be obtained by extracting information of the width of the unloading package W1 from master data including information of widths of individual packages W, or may be obtained by diverting the information about the width when the unloading package W1 was loaded. In addition, the predetermined amount of the arm distance has a value such that there is a certain clearance between the unloading package W1 and the arm, and can be set to 15 mm, for example.

During the unloading travel of the moving cart 7, in Step S3 the conveyance controller 53 measures the width of the unloading package W1 using the first package detection sensor 78 or the second package detection sensor 79. The width of the unloading package W1 is measured using one of the first package detection sensor 78 and the second package detection sensor 79, which is on the front side in the traveling direction in which the cart travels in the unloading travel. Measurement of the width of the unloading package W1 will be described later in detail.

After measuring the width of the unloading package W1, in Step S4 the conveyance controller 53 determines whether or not the measured value of the width of the unloading package W1 measured using the package detection sensor is largely shifted from the width value indicated in the information about the width of the unloading package W1 included in the conveyance command.

Specifically, it is determined whether or not the absolute value of the difference between the measured value of the width of the unloading package W1 and the width value indicated in the information about the width of the unloading package W1 is a first predetermined value or less. For instance, the first predetermined value can be a value such that the first arm 753 and/or the second arm 755 does not interfere with the package W adjacent to the unloading package W1 and/or a pillar of the shelf 11, or a value of approximately a few percent of the unloading package W1.

If the absolute value of the difference described above is larger than the first predetermined value ("No" in Step S4), the conveyance controller 53 determines that the measured value of the width of the unloading package W1 is largely shifted from the width value indicated in the information about the width of the unloading package W1. In this example, the unloading operation of the unloading package W1 proceeds to a retrying operation in Step S10. As described later, in the retrying operation, re-measurement of the width of the unloading package W1 and a predetermined operation based on the re-measurement result are performed.

On the other hand, if the absolute value of the difference between the measured value of the width of the unloading package W1 and the width value indicated in the information about the width of the unloading package W1 is the first predetermined value or less ("Yes" in Step S4), the conveyance controller 53 determines that the measured value of the width of the unloading package W1 is close to the width value indicated in the information about the width of the unloading package W1.

If it is determined that the measured value of the width of the unloading package W1 is close to the width value indicated in the information about the width of the unloading package W1, in Step S5 the conveyance controller 53 determines whether or not the actual placed position of the unloading package W1 on the shelf 11 is shifted from a predetermined position (e.g., the placed position of the unloading package W1 on the shelf 11 indicated in the conveyance command).

The determination whether or not the actual placed position of the unloading package W1 is shifted from the predetermined position is made, for example, based on whether or not the position in the X direction of the package detection sensor on the front side in the traveling direction at timing when the rear end of the unloading package W1 is detected is shifted from the position in the X direction of the front end of the unloading package W1 calculated based on information included in the conveyance command.

If it is determined that the actual placed position of the unloading package W1 on the shelf 11 is shifted from the predetermined position ("Yes" in Step S5), the unloading operation of the unloading package W1 proceeds to the retrying operation in Step S10.

On the other hand, if it is determined that the measured value of the width of the unloading package W1 is close to the width value indicated in the information about the width of the unloading package W1 ("Yes" in Step S4), and if it is determined that the actual placed position of the unloading package W1 on the shelf 11 is not shifted from the predetermined position ("No" in Step S5), the unloading package W1 is transferred from the shelf 11 to the moving cart 7.

Figure 6B:
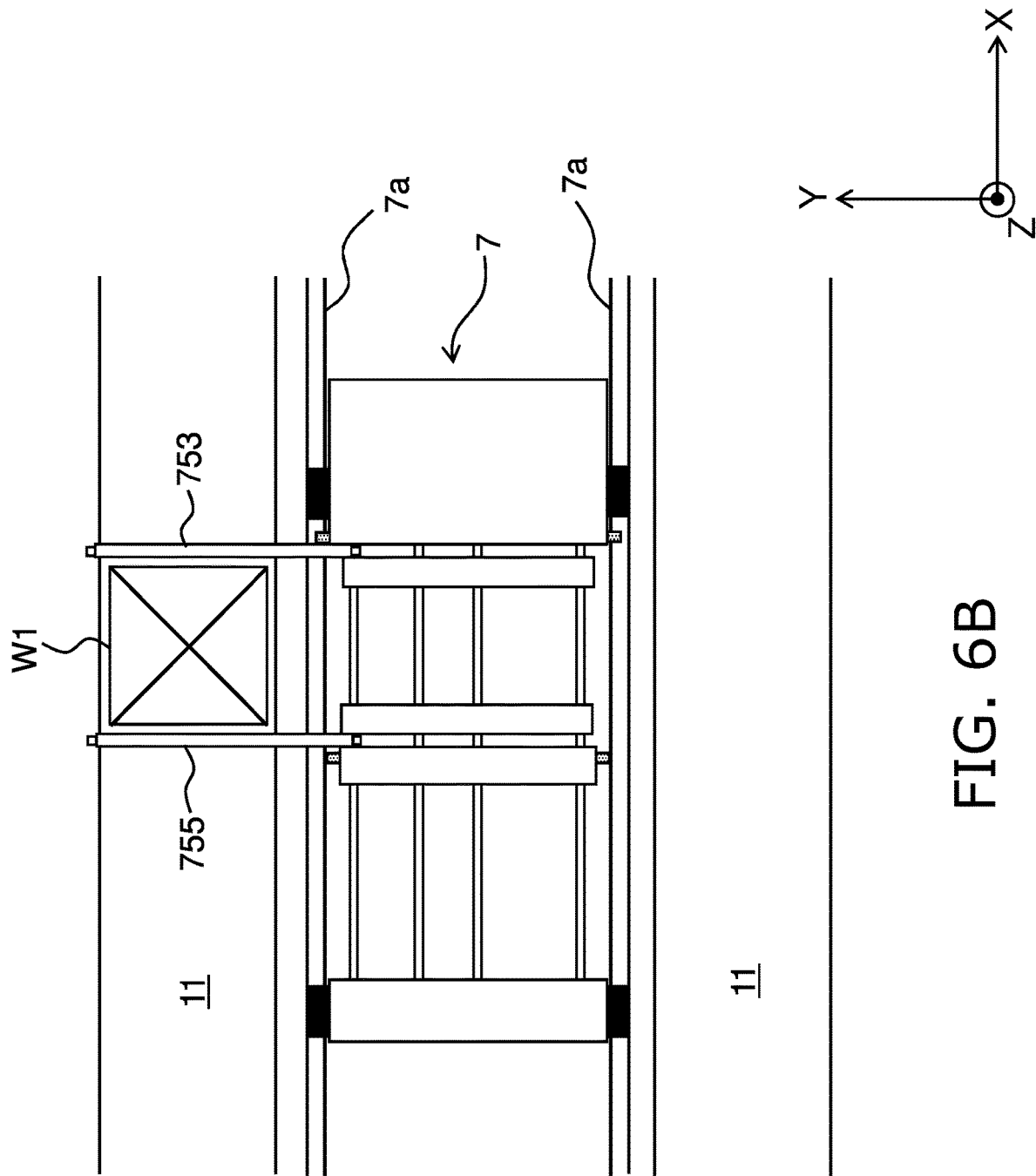
FIG. 6B is a diagram illustrating an example of a state where a first arm and a second arm are extended toward the unloading package.
Figure 6D:
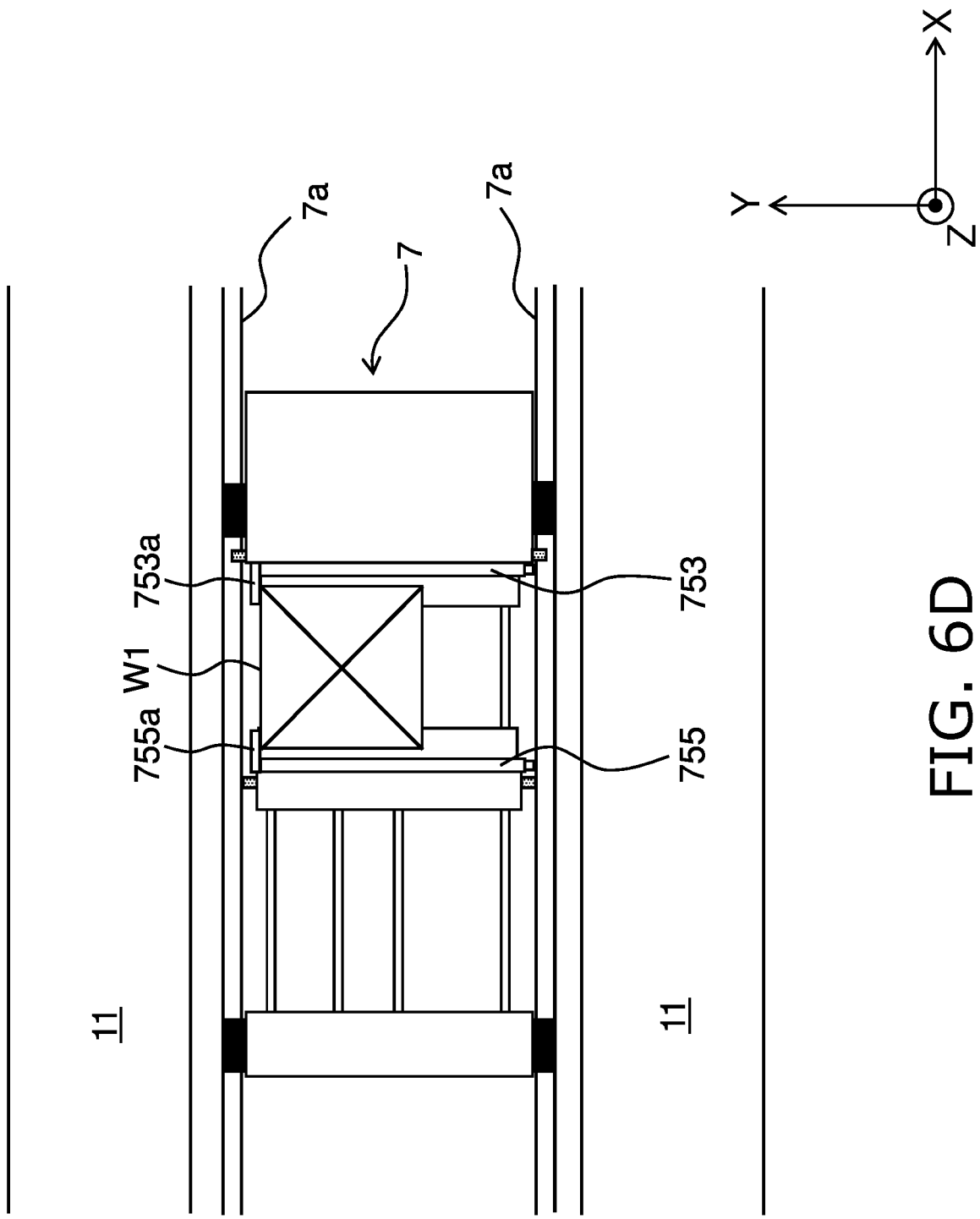
FIG. 6D is a diagram illustrating an example of a state where the unloading package is pulled into the moving cart.

Hereinafter, with reference to FIGS. 5 and 6A to 6D, detailed operations for transferring the unloading package W1 from the shelf 11 to the moving cart 7 are described. FIG. 6A is a diagram illustrating an example of a state where the moving cart 7 has reached the position corresponding to the placed position of the unloading package W1. FIG. 6B is a diagram illustrating an example of a state where the first arm 753 and the second arm 755 are extended toward the unloading package W1. FIG. 6C is a diagram illustrating an example of a state where the hooks 753a and 755a are operated. FIG. 6D is a diagram illustrating an example of a state where the unloading package W1 is pulled into the moving cart 7.

As illustrated in FIG. 6A, after the moving cart 7 reaches the position corresponding to the placed position of the unloading package W1, in Step S6 the conveyance controller 53 extends the first arm 753 and the second arm 755 toward the unloading package W1, while keeping the current arm distance and the positions of the first arm 753 and the second arm 755 after the adjustment by executing Step S2 described above. In the example illustrated in FIG. 6A, the first arm 753 and the second arm 755 are extended in the positive direction of the Y-axis.

In this example, a loading position and a unloading position of the package W are determined with respect to the fixed first arm 753. Therefore, the determination whether or not the moving cart 7 has reached the position corresponding to the placed position of the unloading package W1 is performed based on the position in the X direction of the first arm 753.

After extending the first arm 753 and the second arm 755 in the positive direction of the Y-axis, in Step S7 the conveyance controller 53 sets the length direction of the hooks 753a and 755a to the direction of the space between the first arm 753 and the second arm 755, to set the hooks 753a and 755a to the closed state as illustrated in FIG. 6C.

After setting the hooks 753a and 755a to the closed state, in Step S8 the conveyance controller 53 pulls in the first arm 753 and the second arm 755 toward the moving cart 7 so that the unloading package W1 is pushed by the hooks 753a and 755a and pulled in toward the moving cart 7.

When Steps S6 to S8 described above are performed, the unloading package W1 can be transferred to the moving cart 7 (the transfer device 75) as illustrated in FIG. 6D.

After transferring the unloading package W1 to the moving cart 7, in Step S9 the conveyance controller 53 causes the moving cart 7 carrying the unloading package W1 to travel in the X direction to the position of the relay conveyor 13, to convey the unloading package W1 to the position of the relay conveyor 13. After that, the transfer device 75 transfers the unloading package W1 from the moving cart 7 to the relay conveyor 13 so that the unloading package W1 is unloaded.

As described above, in the transfer device 75 of this example, the arm distance between the first arm 753 and the second arm 755 is first adjusted to the distance larger than the width of the unloading package W1 by a predetermined amount, and then the first arm 753 and the second arm 755 are extended and retracted in the Y direction while keeping the adjusted arm distance to pull in the unloading package W1. In this way, when unloading the unloading package W1, it is not necessary to move the arm to sandwich the unloading package W1 and further to move the arm again to secure a clearance between the unloading package W1 and the arm. Thus, it is possible to reduce the time necessary for transferring the unloading package W1 when performing unloading.

(4-2) Measuring Operation of Width of Unloading Package

Hereinafter, the measuring operation of the width of the unloading package W1 performed in Step S3 of FIG. 5 is described in detail. In this example, the measurement of the width of the unloading package W1 is performed using the package detection sensor on the front side of the moving cart 7 in the traveling direction, during the travel of the moving cart 7 to the position corresponding to the placed position of the unloading package W1. The traveling direction of the moving cart 7 means a direction in which the moving cart 7 moves in the unloading travel. Specifically, if the unloading package W1 is on the positive direction side of the X-axis from the current position of the moving cart 7, the traveling direction is the positive direction of the X-axis. On the other hand, if the unloading package W1 is on the negative direction side of the X-axis from the current position of the moving cart 7, the traveling direction is the negative direction of the X-axis.

The determination whether the traveling direction is the positive direction or the negative direction of the X-axis as a result of the unloading travel can be performed based on, for example, the relative position of the placed position of the unloading package W1 included in the conveyance command with respect to the moving cart 7 and the rotation direction of the wheels 731 in the unloading travel.

In addition, if the traveling direction is the positive direction of the X-axis, the package detection sensor on the front side of the moving cart 7 in the traveling direction is the first package detection sensor 78. On the other hand, if the traveling direction is the negative direction of the X-axis, the package detection sensor on the front side of the moving cart 7 in the traveling direction is the second package detection sensor 79.

Figure 7:
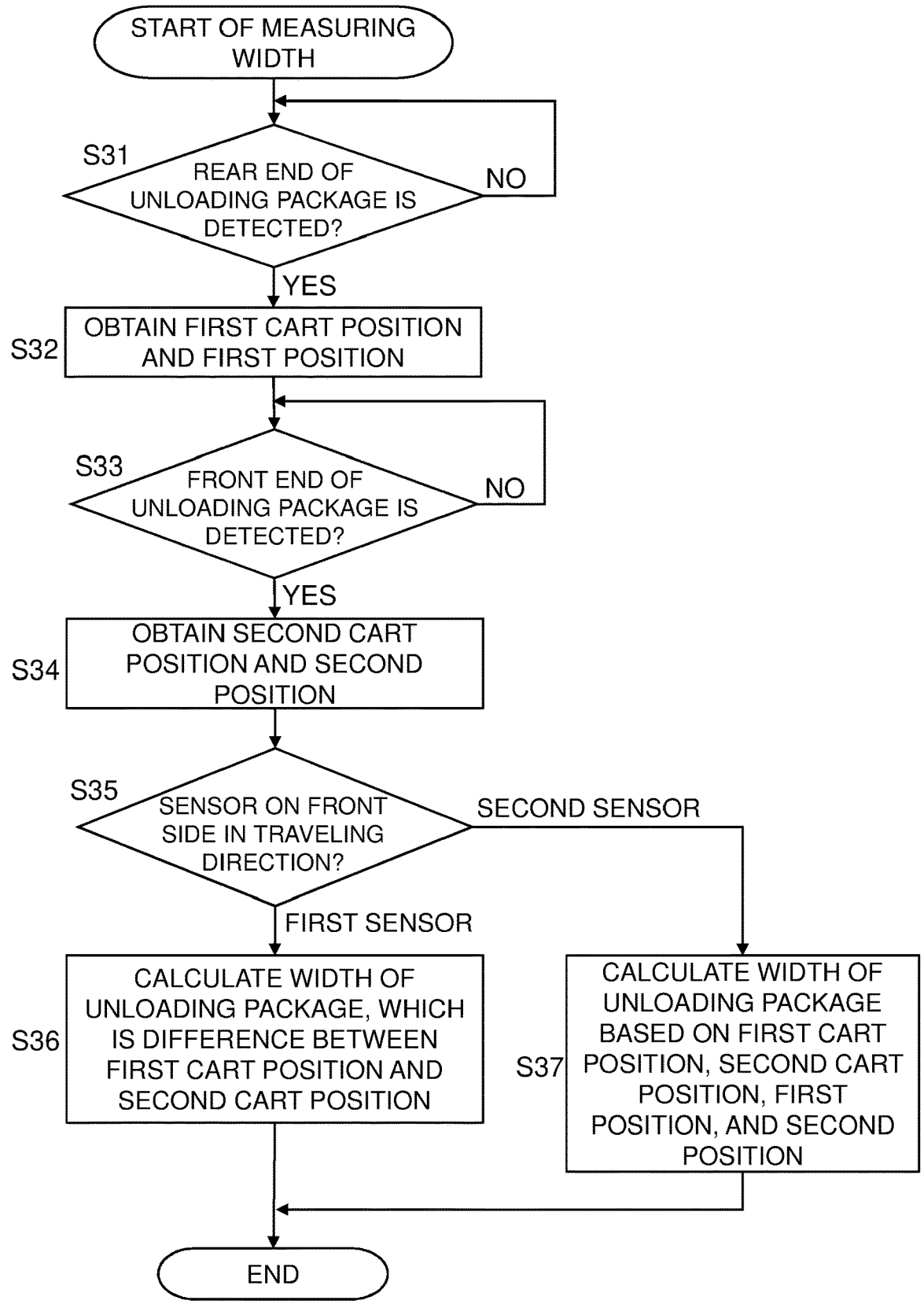
FIG. 7 is a flowchart illustrating a measuring operation of width of the unloading package.

With reference to FIG. 7, the measuring operation of the width of the unloading package W1 is described in detail. FIG. 7 is a flowchart illustrating the measuring operation of the width of the unloading package W1.

During the unloading travel of the moving cart 7, in Step S31 the conveyance controller 53 determines whether or not the package detection sensor on the front side in the traveling direction in the unloading travel has detected the rear end of the unloading package W1.

The rear end of the unloading package W1 is an end opposite to the traveling direction of the moving cart 7 in the unloading travel viewed from the moving cart 7 during the unloading travel. Therefore, when detecting the unloading package W1 with the package detection sensor on the front side in the traveling direction, the rear end of the unloading package W1 is detected first.

Specifically, for example, if the package detection sensor is an optical reflection type sensor, the timing when the package detection sensor on the front side in the traveling direction first detects reflection light from the unloading package W1 is the timing when the rear end of the unloading package W1 is detected. For instance, the rising timing of the output signal from the package detection sensor is the timing when the rear end of the unloading package W1 is detected.

When the package detection sensor on the front side in the traveling direction detects the rear end of the unloading package W1 ("Yes" in Step S31), in Step S32 the conveyance controller 53 obtains the position of the moving cart 7 at the timing when the rear end of the unloading package W1 is detected (referred to as a first cart position), and the position of the second arm 755 on the moving cart 7 at the timing (referred to as a first position).

After that, in Step S33, the conveyance controller 53 further determines whether or not the package detection sensor on the front side in the traveling direction has detected the front end of the unloading package W1. The front end of the unloading package W1 is an end on the traveling direction side of the moving cart 7 in the unloading travel, viewed from the moving cart 7 during the unloading travel. Therefore, when detecting the unloading package W1 with the package detection sensor on the front side in the traveling direction, the front end of the unloading package W1 is detected last.

Specifically, for example, if the package detection sensor is an optical reflection type sensor, the timing when the package detection sensor on the front side in the traveling direction is unable to detect reflection light from the unloading package W1 is the timing when the front end of the unloading package W1 is detected. More specifically, for example, the falling timing of the output signal from the package detection sensor is the timing when the front end of the unloading package W1 is detected.

When the package detection sensor on the front side in the traveling direction detects the front end of the unloading package W1 ("Yes" in Step S33), in Step S34 the conveyance controller 53 obtains the position of the moving cart 7 at the timing when the front end of the unloading package W1 is detected (referred to as a second cart position), and the position of the second arm 755 on the moving cart 7 at the timing (referred to as a second position).

After obtaining the first cart position and the first position at the timing when the rear end of the unloading package W1 is detected, and the second cart position and the second position at the timing when the front end of the unloading package W1 is detected, the conveyance controller 53 calculates the width of the unloading package W1 using these position information.

As described above, the position of the first package detection sensor 78 fixed to the first main body part 73a does not change on the moving cart 7, while the position of the second package detection sensor 79 fixed to the frame 751 can change on the moving cart. Therefore, when calculating the width of the unloading package W1, in Step S35 the conveyance controller 53 determines which one of the first package detection sensor 78 and the second package detection sensor 79 was the package detection sensor on the front side in the traveling direction.

If the first package detection sensor 78 was on the front side in the traveling direction ("first sensor" in Step S35), since the position of the first package detection sensor 78 does not change on the moving cart 7, the distance traveled by the moving cart 7 after the rear end of the unloading package W1 is detected until the front end is detected matches the distance from the rear end of the unloading package W1 to the front end, i.e., the width of the unloading package W1.

Therefore, if the first package detection sensor 78 is on the front side in the traveling direction and when measuring the width of the unloading package W1 with the first package detection sensor 78, in Step S36 the conveyance controller 53 calculates the width of the unloading package W1, which is the distance traveled by the moving cart 7 after the rear end of the unloading package W1 is detected until the front end is detected, i.e., the difference between the first cart position and the second cart position.

On the other hand, if the second package detection sensor 79 is on the front side in the traveling direction ("second sensor" in Step S35), as the position of the second package detection sensor 79 may change on the moving cart 7, the distance traveled by the moving cart 7 after the rear end of the unloading package W1 is detected until the front end is detected does not always match the width of the unloading package W1.

Therefore, if the second package detection sensor 79 is on the front side in the traveling direction, and when measuring the width of the unloading package W1 with the second package detection sensor 79, in Step S37 the conveyance controller 53 calculates the width of the unloading package W1, considering not only the first cart position and the second cart position, but also the position of the second arm 755 on the moving cart 7 when the rear end of the unloading package W1 is detected (the first position), and the position of the second arm 755 on the moving cart 7 when the front end of the unloading package W1 is detected (the second position).

Figure 8A:
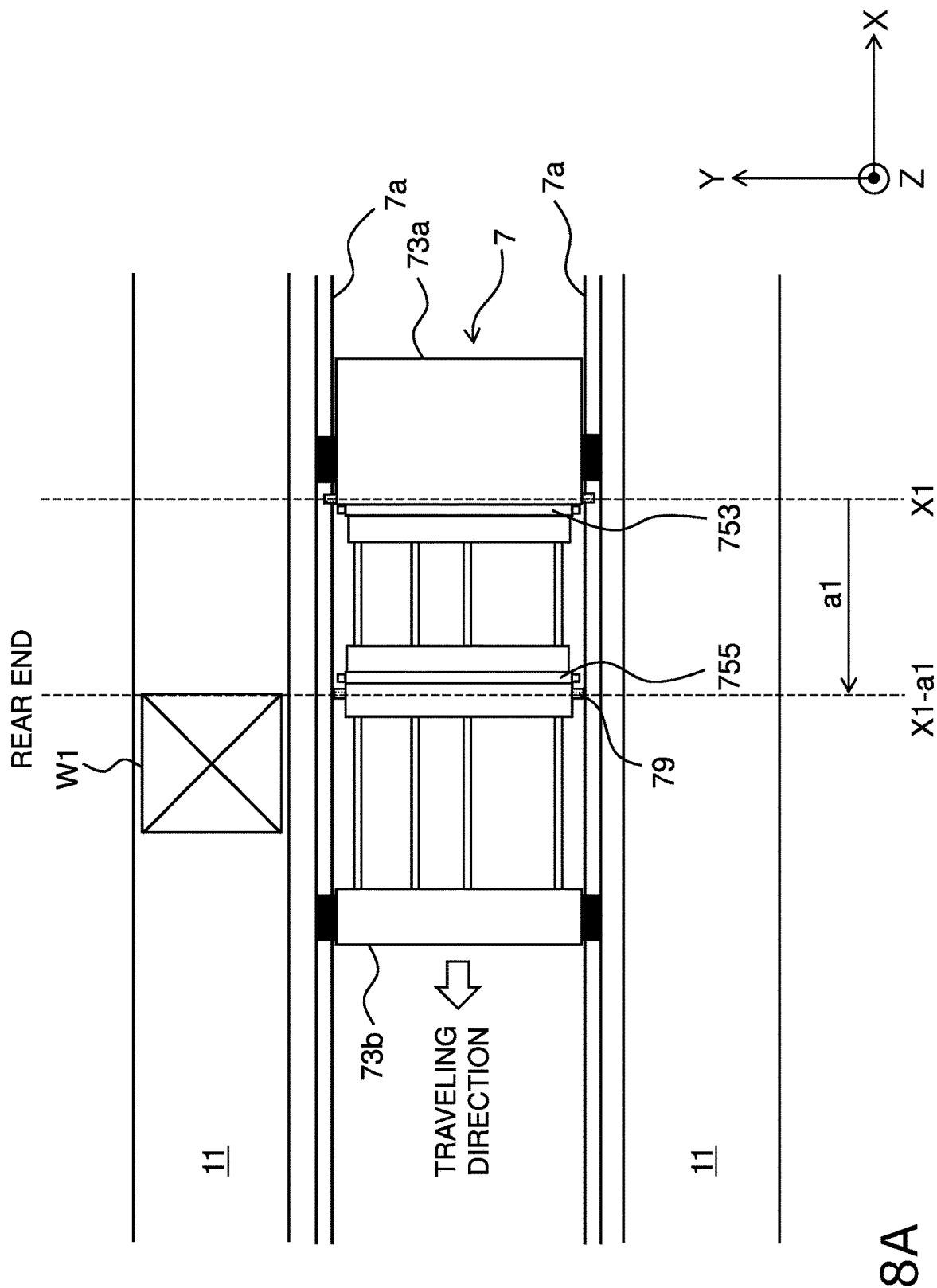
FIG. 8A is a diagram illustrating an example where a rear end of the unloading package is detected by a second package detection sensor.

Specifically, for example, it is supposed that a reference position of the moving cart 7 is the attachment position of the first package detection sensor 78, and that the position of the second arm 755 on the moving cart 7 is defined as a position of the second package detection sensor 79 in the X direction (the negative direction of the X-axis) with respect to the reference position. Further it is supposed that the reference position of the moving cart 7 (the first cart position) is X1, and that the distance between the position of the second arm 755 on the moving cart 7 (the first position) and the reference position of the moving cart 7 is a1. When the rear end of the unloading package W1 is detected by the second package detection sensor 79, the position of the rear end of the unloading package W1 in the X direction can be calculated to be X1-a1. FIG. 8A is a diagram illustrating an example of a state where the rear end of the unloading package W1 is detected by the second package detection sensor 79.

Figure 8B:
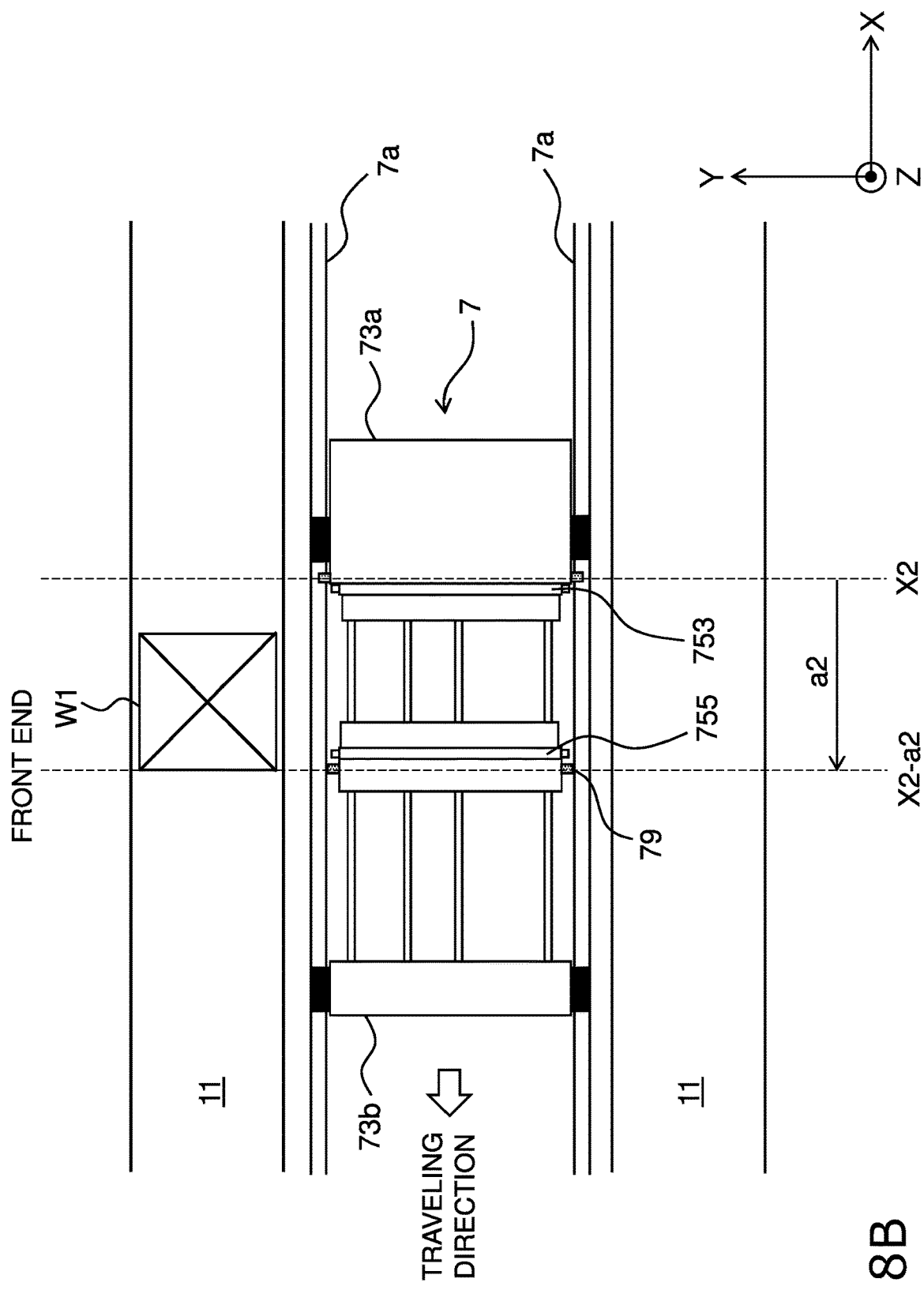
FIG. 8B is a diagram illustrating an example where a front end of the unloading package is detected with the second package detection sensor.

On the other hand, as illustrated in FIG. 8B, it is supposed that the reference position of the moving cart 7 (the second cart position) is X2, and that the distance between the position of the second arm 755 on the moving cart 7 (the second position) and the reference position of the moving cart 7 is a2. When the front end of the unloading package W1 is detected by the second package detection sensor 79, the position of the front end of the unloading package W1 in the X direction can be calculated to be X2-a2. FIG. 8B is a diagram illustrating an example of a state where the front end of the unloading package W1 is detected by the second package detection sensor 79.

The width of the unloading package W1 can be calculated as the difference between the position of the front end and the position of the rear end of the unloading package W1. Therefore, the width of the unloading package W1 illustrated in FIGS. 8A and 8B can be calculated as an absolute value of (X2-a2)-(X1-a1).

The above expression (X2-a2)-(X1-a1) indicating the width of the unloading package W1 can be transformed into (X2-X1)-(a2-a1). X2-X1 corresponds to a movement amount of the moving cart 7 after the rear end of the unloading package W1 is detected until the front end is detected. On the other hand, a2-a1 corresponds to a movement amount of the second arm 755 after the rear end of the unloading package W1 is detected until the front end is detected. Therefore, the width of the unloading package W1 can be expressed as a difference between the movement amount of the moving cart 7 and the movement amount of the second arm 755 after the rear end of the unloading package W1 is detected until the front end is detected. By calculating the width of the unloading package W1 using the above expression, the width of the unloading package W1 can be measured even if the second arm 755 is moving with respect to the moving cart 7, i.e., even if the distance between the position of the second arm 755 and the reference position of the moving cart 7 is changing.

For example, when completing the movement of the second arm 755 before starting the unloading travel, if the distance from start of the unloading travel to start of measuring the unloading package W1 is long enough to complete the movement of the second arm 755 in the X direction, the width of the unloading package W1 can be calculated to be X2-X1, using only the reference positions of the moving cart 7 at the timings when the second package detection sensor 79 detects the rear end and the front end of the unloading package W1. The reason why is that a2-a1=0 can be satisfied in the example described above.

By executing Steps S31 to S37 described above, the width of the unloading package W1 can be accurately measured, using the first package detection sensor 78 or the second package detection sensor 79 on the front side in the traveling direction of the moving cart 7 in the unloading travel.

The traveling direction of the moving cart 7 is known before performing the measurement of the width of the unloading package W1, and hence it can be determined which one of the first package detection sensor 78 and the second package detection sensor 79 is to be used to measure the width of the unloading package W1, before performing the measurement of the width of the unloading package W1. Therefore, if it is determined to use the first package detection sensor 78 to measure the width of the unloading package W1 before performing the measurement of the width of the unloading package W1, the conveyance controller 53 does not need to obtain the first position in Step S32 and does not need to obtain the second position in Step S34.

(4-3) Retrying Operation (4-3-1) Outline

Hereinafter, the retrying operation performed in Step S10 of FIG. 5 is described in detail. As described above, the retrying operation is performed when there is a difference between the measurement result of the width of the unloading package W1 using the package detection sensor and information indicated in the conveyance command. In addition, the retrying operation includes the remeasurement of the width of the unloading package W1 and a predetermined operation based on the remeasurement result. Hereinafter, the retrying operation when the measurement result of the width of the unloading package W1 is shifted from the width value indicated in the conveyance command, and the retrying operation when a shift of the package is detected are described individually.

Figure 9:
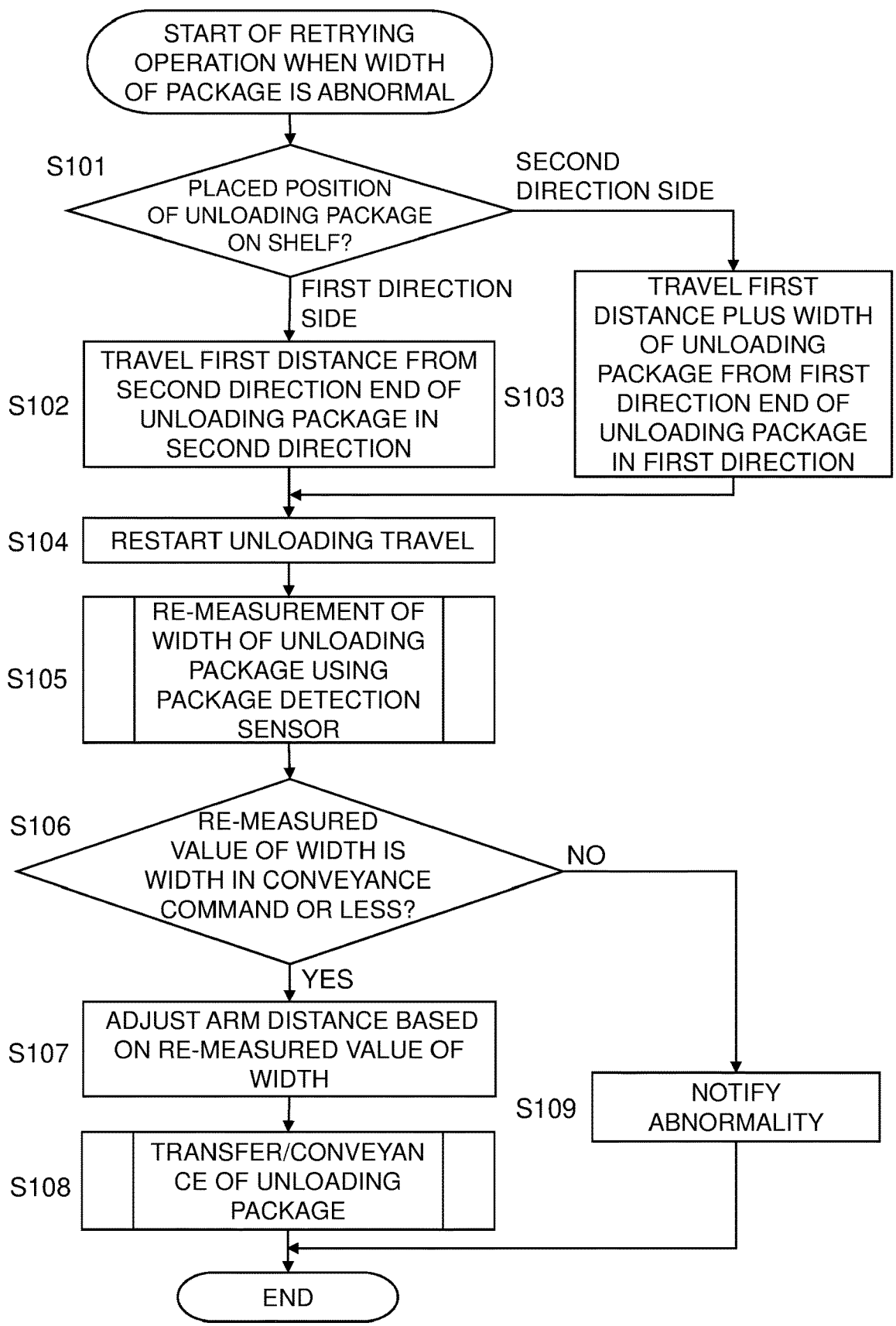
FIG. 9 is a flowchart illustrating a retrying operation when a measurement result of the width of the unloading package is shifted from a width value indicated in a conveyance command.

(4-3-2) Retrying Operation when Measurement Result of Width is Shifted from Width in Conveyance Command With reference to FIG. 9, the retrying operation performed when the measurement result of the width of the unloading package W1 is shifted from the width value indicated in the conveyance command, i.e., when the absolute value of the difference between the measured value of the width of the unloading package W1 and the width value indicated in the information about the width of the unloading package W1 is a first predetermined value or more ("No" in Step S4) is described. FIG. 9 is a flowchart illustrating the retrying operation when the measurement result of the width of the unloading package W1 is shifted from the width value indicated in the conveyance command. In the following description, the positive direction of the X-axis in FIG. 3 is referred to as a "first direction," and the direction opposite to the first direction, i.e., the negative direction of the X-axis is referred to as a "second direction."

Figure 10A:
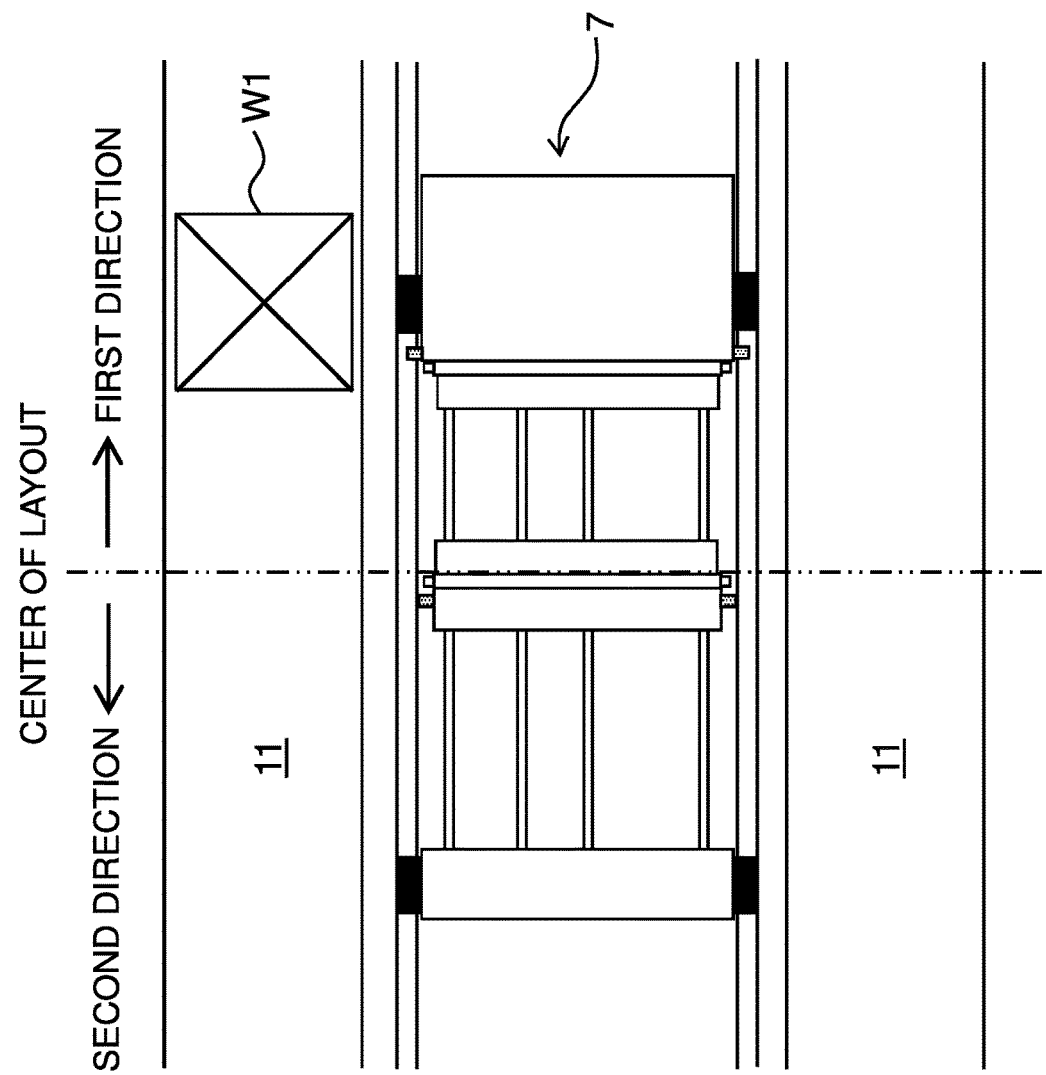
FIG. 10A is a diagram illustrating an example where the unloading package is placed on the side close to a first direction side end of a shelf.
Figure 10B:
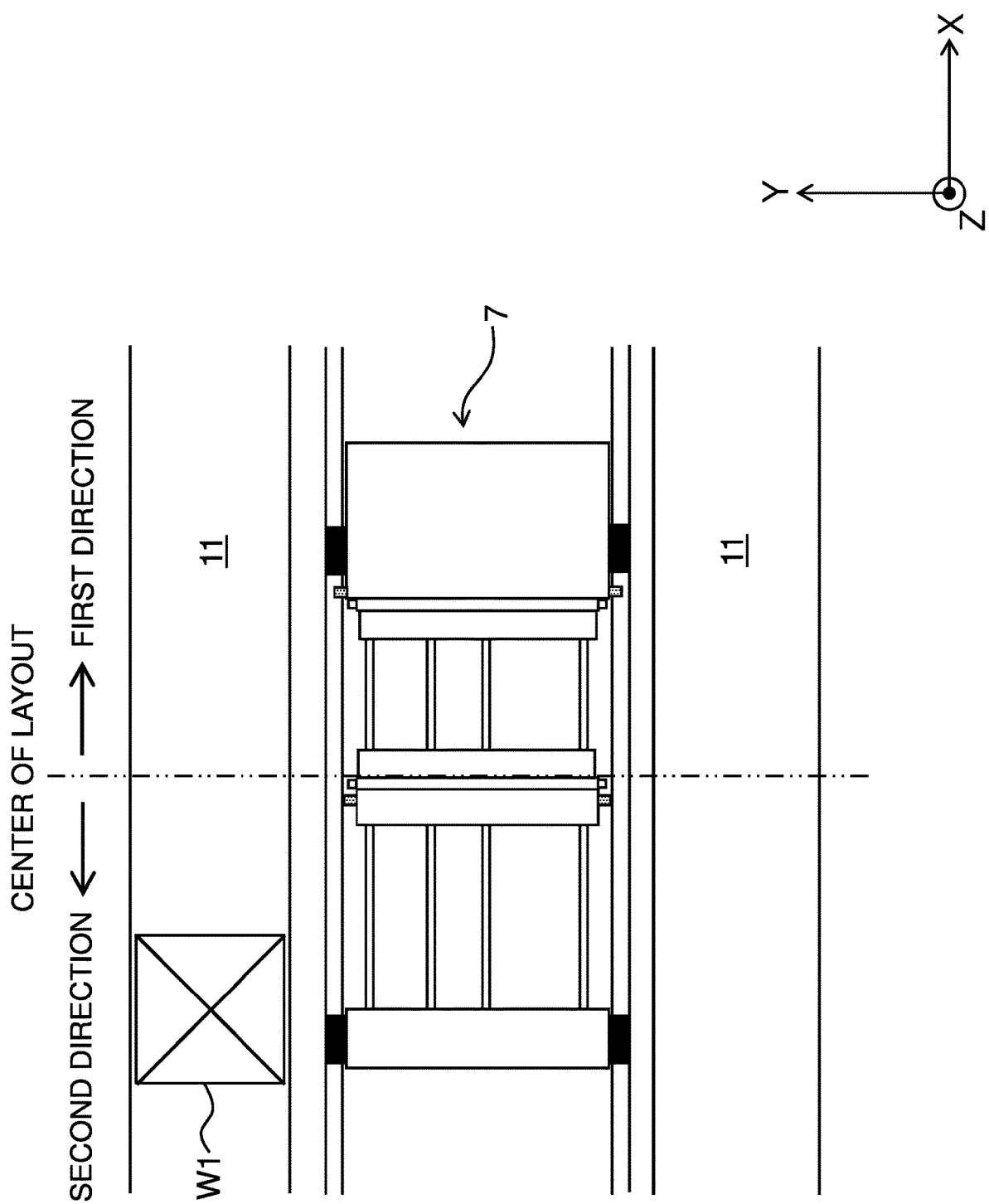
FIG. 10B is a diagram illustrating an example where the unloading package is placed on the side close to a second direction side end of the shelf.

The retrying operation is started from the remeasurement of the width of the unloading package W1. In the retrying operation, when performing the re-measurement of the width of the unloading package W1, the conveyance controller 53 causes the moving cart 7 to move to a position away from the placed position of the unloading package W1 whose width is to be re-measured. This moving operation differs depending on whether the unloading package W1, whose width is to be remeasured, is placed on the side closer to the first direction side end of the shelf 11 than to the second direction side end of the shelf 11, as illustrated in FIG. 10A, or on the side closer to the second direction side end of the shelf 11 than to the first direction side end of the shelf 11, as illustrated in FIG. 10B, with respect to the layout center of the entire shelf 11 (e.g., the center position in the extending direction of the shelf 11). FIG. 10A is a diagram illustrating an example of a state where the unloading package W1 is placed on the side closer to the first direction side end of the shelf 11 than to the second direction side end of the shelf 11. FIG. 10B is a diagram illustrating an example of a state where the unloading package W1 is placed on the side closer to the second direction side end of the shelf 11 than to the first direction side end of the shelf 11.

Therefore, first in Step S101, the conveyance controller 53 refers to the conveyance command, and determines whether the unloading package W1 whose width is to be remeasured is placed on the side closer to the first direction side end of the shelf 11 than to the second direction side end of the shelf 11, or on the side closer to the second direction side end than to the first direction side end of the shelf 11, with respect to the layout center of the entire shelf 11.

If the unloading package W1 whose width is to be remeasured is placed on the side closer to the first direction side end of the shelf 11 than to the second direction side end of the shelf 11 ("first direction side" in Step S101), in Step S102 the conveyance controller 53 causes the moving cart 7 to travel from the second direction end side of the unloading package W1 in the second direction by a first distance d1.

The first distance d1 described above is sufficient to be a distance such that the package detection sensor to be used for the remeasurement of the width of the unloading package W1 is positioned outside the unloading package W1. In addition, it may be possible that a position (XA) of a second direction side boundary A of a scanning detection range of the unloading package W1 in the X direction matches a position in the X direction of the package detection sensor used for the remeasurement.

Figure 11A:
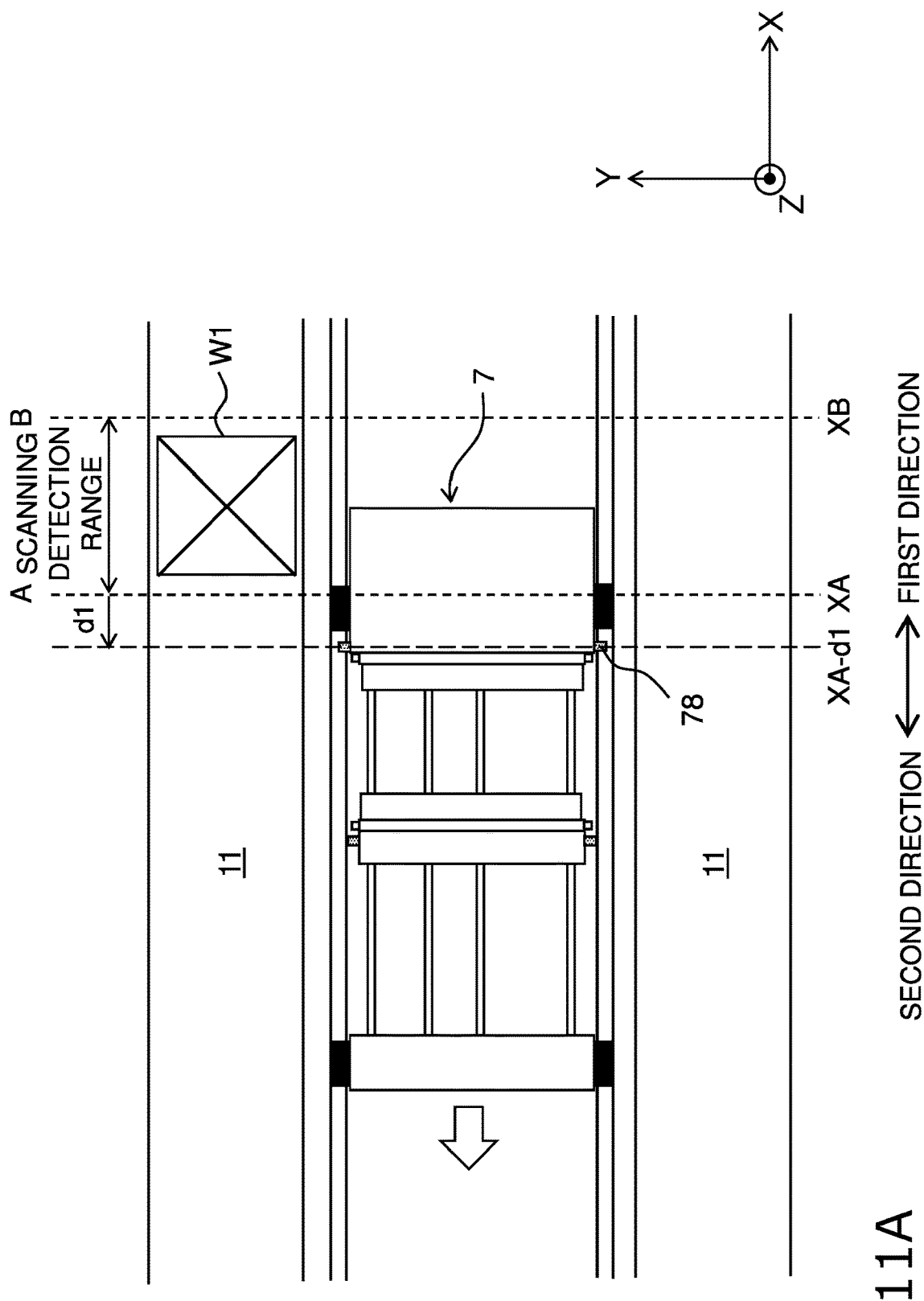
FIG. 11A is a diagram illustrating an example where the moving cart is caused to travel in the second direction in re-measurement of the width of the unloading package.

Specifically, the moving cart 7 is caused to travel, as illustrated in FIG. 11A so that the first package detection sensor 78 of the moving cart 7 is positioned at a position apart from the second direction side boundary A of the scanning detection range of the unloading package W1 in the second direction by the first distance d1. FIG. 11A is a diagram illustrating an example of a state where the moving cart 7 is caused to travel in the second direction in the remeasurement of the width of the unloading package W1.

More specifically, when the position of the second direction side boundary A of the scanning detection range of the unloading package W1 in the X direction is XA, the moving cart 7 is caused to travel in the second direction until the position such that the position of the first package detection sensor 78 in the X direction (the position of the moving cart 7 in the X direction) becomes XA−d1.

The scanning detection range of the package W is defined as a range of the position of the moving cart 7 in which the package detection sensor can detect the package W. In this example, packages W of the same size are placed on one shelf 11. In addition, the scanning detection range described above is determined based on a size of the package W placed on the shelf 11, and hence the same scanning detection range is determined on one shelf 11.

When the moving cart 7 moves in the second direction until the position of the first package detection sensor 78 in the X direction becomes XA−d1 as illustrated in FIG. 11A, the first package detection sensor 78 is at a position apart from the second direction side boundary A of the scanning detection range of the unloading package W1 in the second direction by the first distance d1. As a result, the first package detection sensor 78 is at a position further apart from the second direction side end of the unloading package W1 in the second direction. In other words, the first distance d1 corresponds to a distance at which the first package detection sensor 78 exists on the second direction side from the second direction side end of the unloading package W1, when the moving cart 7 moves in the second direction.

On the other hand, the unloading package W1 whose width is to be re-measured is placed on the side closer to the second direction side end of the shelf 11 than to the first direction side end of the shelf 11 ("second direction side" in Step S101), in Step S103 the conveyance controller 53 causes the moving cart 7 to travel from the first direction end side of the unloading package W1 in the first direction by the distance corresponding to the sum of the width value indicated in the information about the width of the unloading package W1 included in the conveyance command and the first distance d1 described above.

Figure 11B:
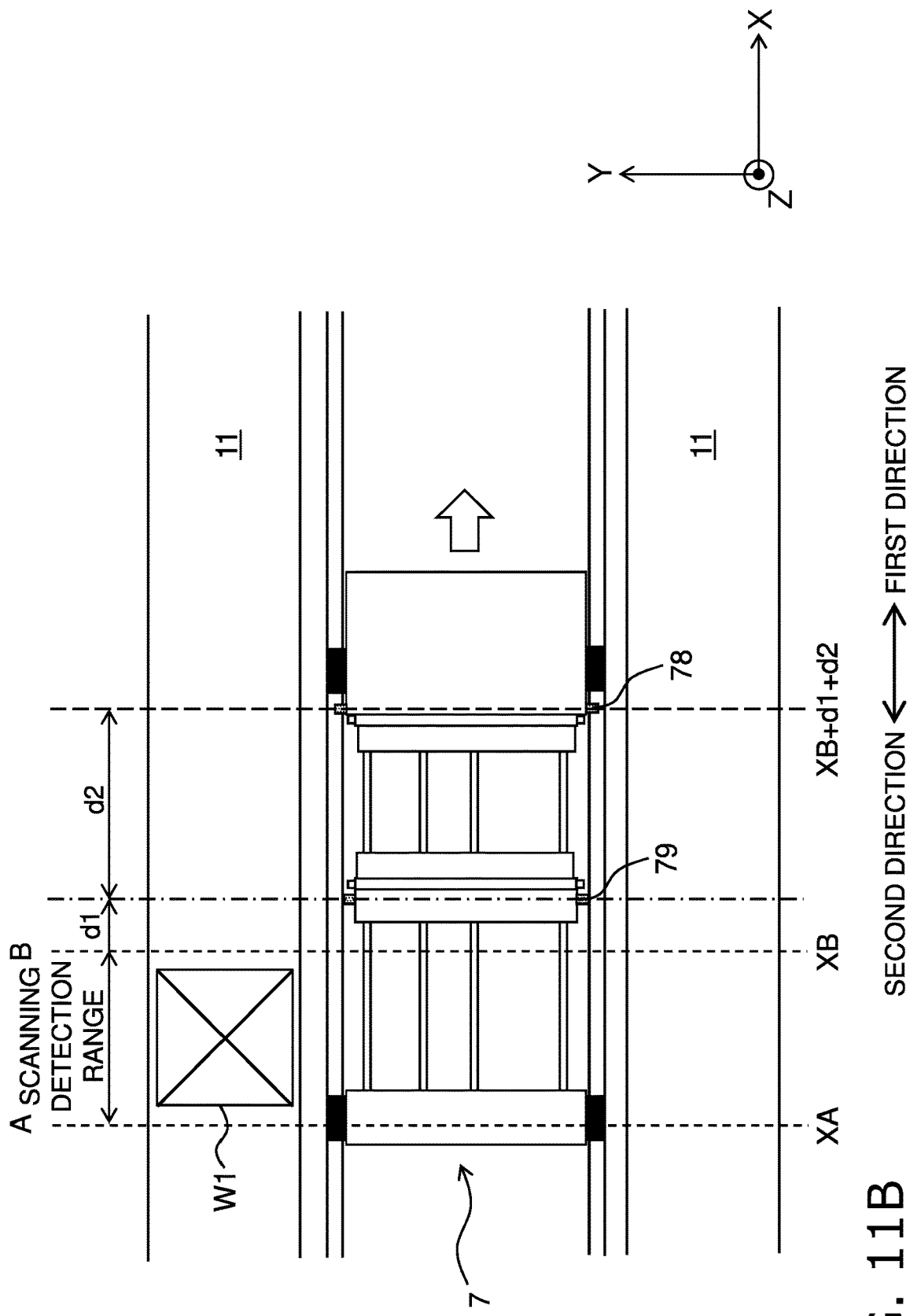
FIG. 11B is a diagram illustrating an example where the moving cart is caused to travel in the first direction in the re-measurement of the width of the unloading package.

Specifically, as illustrated in FIG. 11B, the moving cart 7 is caused to travel in the first direction so that the first package detection sensor 78 of the moving cart 7 exists at a position further apart from the position, which is apart from the first direction side boundary B of the scanning detection range of the unloading package W1 in the first direction by the first distance d1, in the first direction by a distance corresponding to a width vale d2 of the unloading package W1 included in the conveyance command. FIG. 11B is a diagram illustrating an example of a state where the moving cart 7 is caused to travel in the first direction in the remeasurement of the width of the unloading package W1.

More specifically, when the position of the second direction side boundary B of the scanning detection range of the unloading package W1 in the X direction is XB, and the width value indicated in the information about the width of the unloading package W1 included in the conveyance command is d2, the moving cart 7 is caused to travel in the first direction to a position where the position of the first package detection sensor 78 in the X direction (the position of the moving cart 7 in the X direction) becomes XB+d1+d2.

As illustrated in FIG. 11B, when the moving cart 7 moves in the first direction until the position of the first package detection sensor 78 in the X direction becomes XB+d1+d2, the second package detection sensor 79 is positioned at the position apart from the first direction side boundary B of the scanning detection range of the unloading package W1 in the first direction by the first distance d1. As a result, it is at a position further apart from the first direction side end of the unloading package W1 in the first direction side.

During the travel of the moving cart 7 in the first direction, the conveyance controller 53 causes the second arm 755 to move so that the arm distance between the first arm 753 and the second arm 755 matches the width value indicated in the information about the width of the unloading package W1 included in the conveyance command.

By executing Steps S101 to S103 described above in the remeasurement of the width of the unloading package W1, the moving cart 7 can be moved in the direction opposite to the end side of the shelf 11 at which the unloading package W1 is placed. In this way, if the unloading package W1 is placed on the side closer to the other end than to one end in the extending direction of the shelf 11 on the entire shelf 11, the re-measurement of the width of the unloading package W1 can be performed, while avoiding further movement of the moving cart 7 in the other end direction of the shelf 11 in the re-measurement of the unloading package W1. As a result, it is not necessary to provide the rails 7a on the other end side beyond the region in which the package W can be placed on the shelf 11 (the region corresponding to the travel route of the moving cart 7), for the re-measurement of the unloading package W1.

Figure 12:
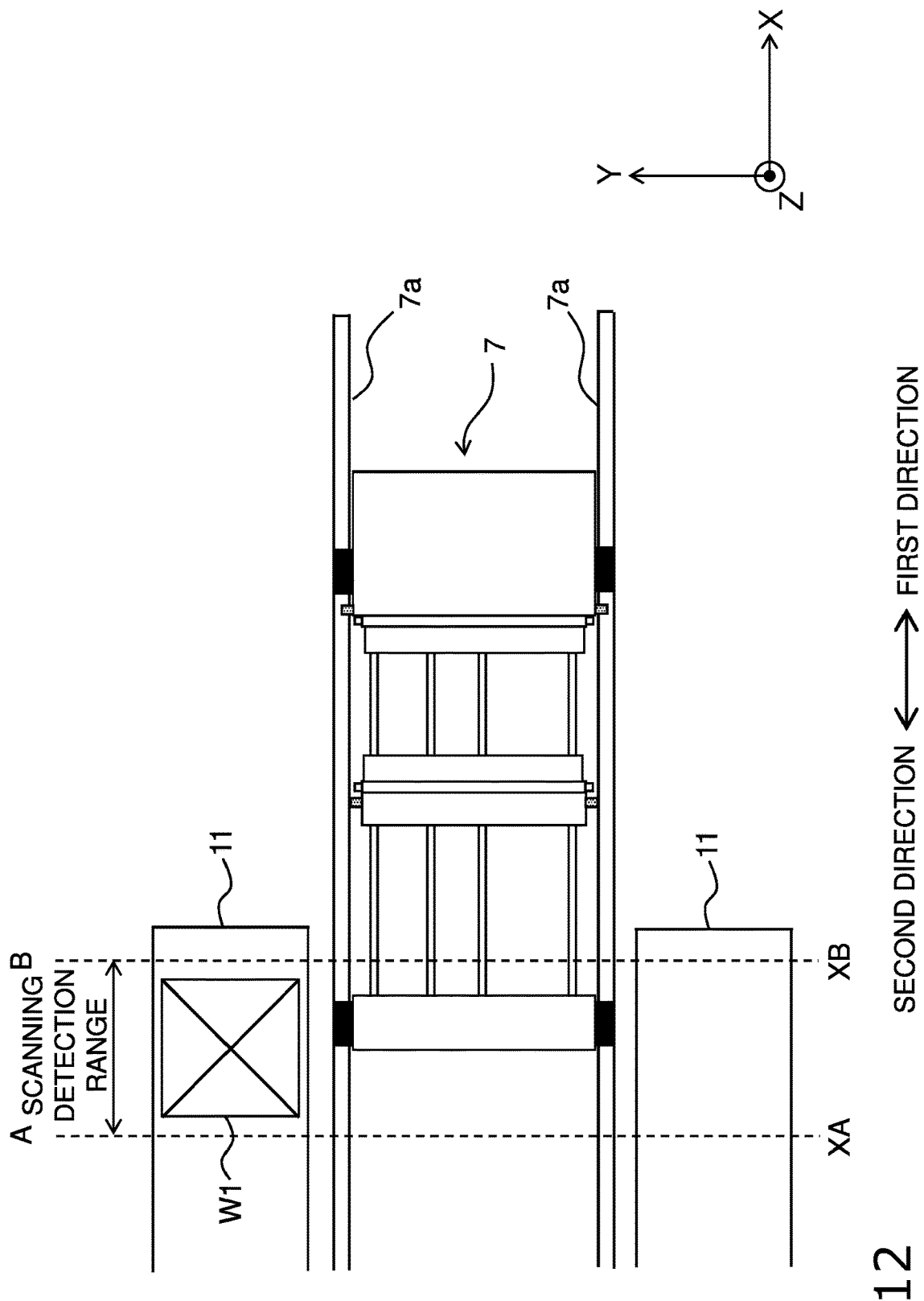
FIG. 12 is a diagram illustrating an example of supposing that the moving cart is moved further in the first direction for re-measurement, when the unloading package whose width is to be re-measured is placed at the first direction side end of the shelf.

For instance, when the unloading package W1 whose width is to be re-measured is placed to the first direction side end than to the second direction side end of the shelf 11, it is supposed to move the moving cart 7 in the first direction for the re-measurement. Then, as illustrated in FIG. 12, the moving cart 7 travels beyond the first direction side end of the shelf 11. In this example, so that the moving cart 7 can further travel in the first direction beyond the first direction side end of the shelf 11, it is necessary to provide the rails 7a extending further in the first direction beyond the region where the package W can be placed on the shelf 11 (beyond the first direction side end). FIG. 12 is a diagram illustrating an example of supposing that the moving cart 7 is further moved in the first direction for the re-measurement, when the unloading package W1 whose width is to be re-measured is at the first direction side end of the shelf 11.

With reference to FIG. 9 again, after executing Steps S101 to S103 to move the moving cart 7 to an appropriate position, in Step S104 the conveyance controller 53 causes the moving cart 7 to perform the unloading travel from this position to the position corresponding to the placed position of the unloading package W1. The unloading travel, which is performed in Step S104 to accurately perform the re-measurement of the unloading package W1, is performed with a travel speed lower than that of the usual unloading travel performed in Step S3 described above.

In addition, if the unloading package W1 whose width is to be re-measured is placed on the side close to the first direction side end of the shelf 11, the moving cart 7 exists on the second direction side further from the second direction side end of the unloading package W1, and hence the moving cart 7 performs the unloading travel in the first direction as the traveling direction.

On the other hand, if the unloading package W1 whose width is to be re-measured is placed on the side close to the second direction side end of the shelf 11, the moving cart 7 exists on the first direction side further from the first direction side end of the unloading package W1, and hence the moving cart 7 performs the unloading travel in the second direction as the traveling direction.

During the unloading travel of Step S104, the conveyance controller 53 executes Steps S31 to S37 described above in Step S105 to re-measure the width of the unloading package W1 using the package detection sensor.

If the unloading package W1 whose width is to be re-measured is placed on the side closer to the first direction side end of the shelf 11, the moving cart 7 performs the unloading travel in the first direction as the traveling direction, and hence it re-measures the width of the unloading package W1 using the first package detection sensor 78.

On the other hand, if the unloading package W1 whose width is to be re-measured is placed on the side closer to the second direction side end of the shelf 11, the moving cart 7 performs the unloading travel in the second direction as the traveling direction, and hence it re-measures the width of the unloading package W1 using the second package detection sensor 79.

After performing the re-measurement of the width of the unloading package W1, the conveyance controller 53 performs a predetermined operation based on a re-measurement result of the width of the unloading package W1. Specifically, the conveyance controller 53 performs different processes depending on whether the re-measured value of the width of the unloading package W1 is larger or smaller than the width value indicated in the information about the width of the unloading package W1 included in the conveyance command. Therefore, after performing the re-measurement of the width of the unloading package W1, in Step S106 the conveyance controller 53 determines whether the re-measured value of the width of the unloading package W1 is larger or smaller than the width value indicated in the information about the width of the unloading package W1 included in the conveyance command.

If the re-measured value of the width of the unloading package W1 is smaller than the width value indicated in the information about the width of the unloading package W1 ("Yes" in Step S106), i.e., if the actual width of the unloading package W1 is smaller than the width indicated in the conveyance command, in Step S107 the conveyance controller 53 executes Step S2 described above, to move the second arm 755 from the state where the arm distance is adjusted to the first distance larger than the value indicated in the information about the width of the unloading package W1 by a predetermined amount, and to adjust the arm distance between the first arm 753 and the second arm 755 to be larger than the re-measured width of the unloading package W1 by the predetermined amount.

After that, the conveyance controller 53 executes Steps S6 to S9 described above in Step S108, to pull in and transfer the unloading package W1 to the moving cart 7 side, while keeping the arm distance between the first arm 753 and the second arm 755 at the distance adjusted in Step S107.

As described above, when starting the unloading travel, Step S2 of FIG. 5 is executed so that the arm distance is adjusted to the first distance larger than the value indicated in the information about the width of the unloading package W1 included in the conveyance command by the predetermined amount, and then the arm distance is adjusted to distance larger than the width of the unloading package W1 indicated in the re-measurement result by the predetermined amount, from the state where the arm distance is adjusted to the first distance. Thus, the movement distance of the second arm 755 can be reduced when adjusting the arm distance based on the re-measurement result.

By reducing the movement distance of the second arm 755 when adjusting the arm distance based on the re-measurement result, even if the time after the measurement of the width of the unloading package W1 is finished until the moving cart 7 stops is short, the transfer of the unloading package W1 can be performed promptly after the moving cart 7 stops. The reason why is that the time after the re-measurement of the width of the unloading package W1 is completed until the adjustment of the arm distance is completed can be reduced by reducing the movement distance of the second arm 755.

On the other hand, if the re-measured value of the width of the unloading package W1 is larger than the width value indicated in the information about the width of the unloading package W1 ("No" in Step S106), i.e., if the actual width of the unloading package W1 is larger than the width indicated in the conveyance command, in Step S109 the conveyance controller 53 notifies abnormality. For instance, the conveyance controller 53 notifies abnormality by turning on a warning lamp, producing warning sound, or displaying a warning on a predetermined display screen.

As described above, the process is different depending on whether the actual width of the unloading package W1 obtained by the remeasurement is larger or smaller than the width indicated in the conveyance command, because of the following reason.

If the actual width of the unloading package W1 obtained by the re-measurement is smaller than the width indicated in the conveyance command, when the first arm 753 and the second arm 755 are extended toward the unloading package W1 after adjusting the arm distance according to the re-measured value of the width of the unloading package W1, the first arm 753 and the second arm 755 do not interfere with other package W placed adjacent to the unloading package W1. Therefore, the transfer of the unloading package W1 from the shelf 11 to the moving cart 7 can be safely performed.

On the other hand, if the actual width of the unloading package W1 obtained by the remeasurement is larger than the width indicated in the conveyance command, when the first arm 753 and the second arm 755 are extended toward the unloading package W1 after adjusting the arm distance according to the re-measured value of the width of the unloading package W1, the first arm 753 or the second arm 755 may interfere with other package W placed adjacent to the unloading package W1. Therefore, the transfer of the unloading package W1 from the shelf 11 to the moving cart 7 cannot be safely performed. Accordingly, if the actual width of the unloading package W1 obtained by the remeasurement is larger than the width indicated in the conveyance command, abnormality is notified, and the user can check, for example, whether or not a large package W is placed in error, whether or not the package detection sensor causes an abnormality, or the like.

Even if the actual width of the unloading package W1 obtained by the remeasurement is larger than the width indicated in the conveyance command, if no other package W is placed adjacent to the unloading package W1 on the shelf 11, the conveyance controller 53 may perform the transfer of the unloading package W1 by increasing the arm distance to distance larger than the width of the unloading package W1 (the remeasured width) by the predetermined amount, without notifying abnormality.

(4-3-3) Retrying Operation when Package Shift is Detected

Figure 13:
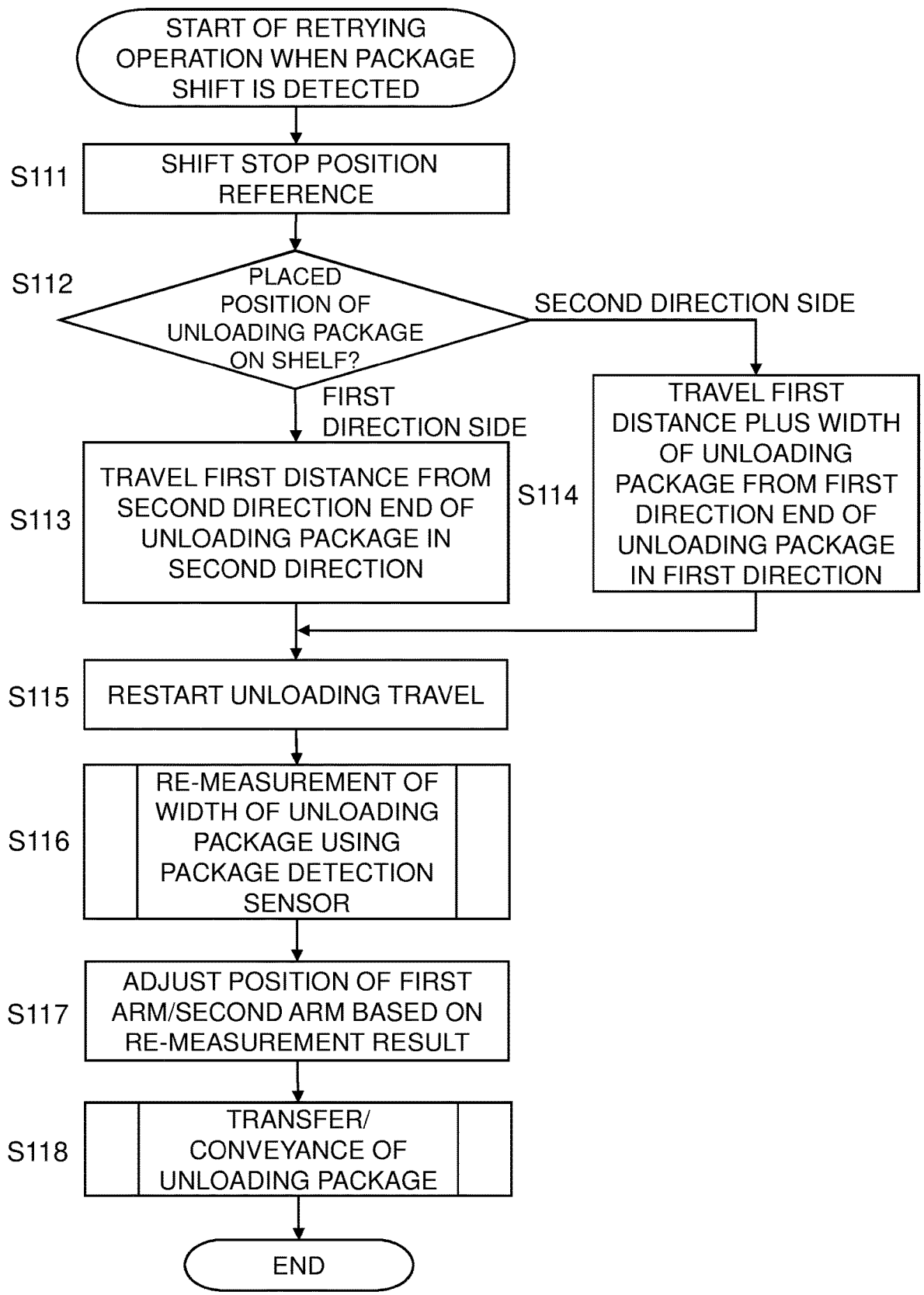
FIG. 13 is a flowchart illustrating a retrying operation when a package shift is detected.

With reference to FIG. 13, the retrying operation performed when a package shift is detected, i.e., when the actual placed position of the unloading package W1 on the shelf 11 is shifted from the predetermined position ("Yes" in Step S5) is described. FIG. 13 is a flowchart illustrating the retrying operation when a package shift is detected.

When starting the retrying operation when a package shift is detected, in Step S111 the conveyance controller 53 shifts a stop position reference of the moving cart 7 when performing the transfer of the unloading package W1, in the detected shift direction of the unloading package W1 by a certain amount.

The stop position reference when performing the transfer of the unloading package W1 is determined based on a positional relationship between the first direction side end of the unloading package W1 placed at an appropriate position on the shelf 11 and the first arm 753 (the first package detection sensor 78).

Figure 14:
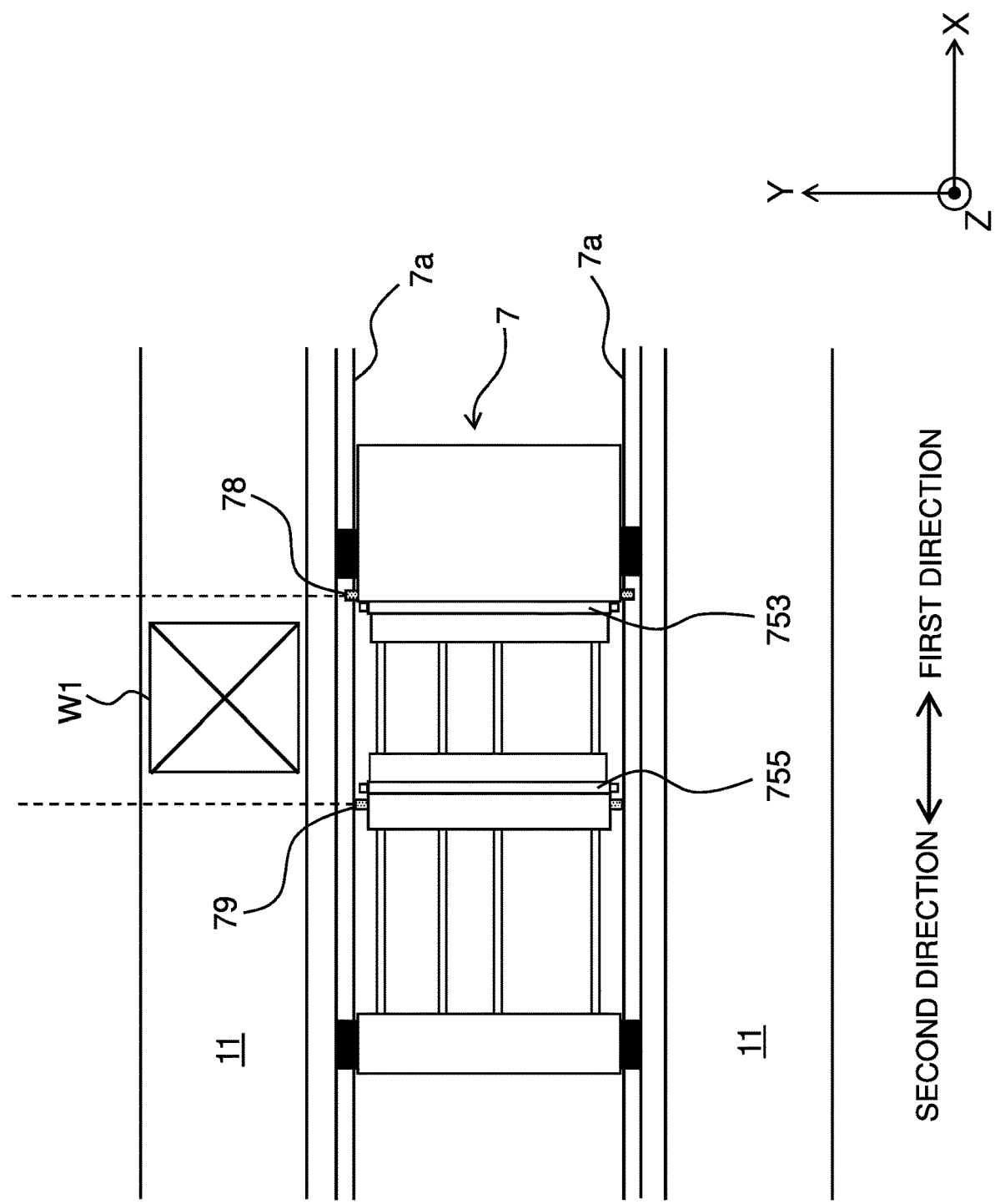
FIG. 14 is a diagram schematically illustrating definition of a stop position reference.

Specifically, for example, as illustrated in FIG. 14, the stop position reference of the moving cart 7 can be determined as a position when the first arm 753 (the first package detection sensor 78) is further on the first direction side from the first direction end of the unloading package W1 placed at the appropriate position on the shelf 11, and when the width of the unloading package W1 in the X direction is included between the position in the X direction of the first package detection sensor 78 and the position in the X direction of the second package detection sensor 79. FIG. 14 is a diagram schematically illustrating the definition of the stop position reference.

After shifting the stop position reference in the shift direction of the unloading package W1, the conveyance controller 53 causes the moving cart 7 to travel again, for example, and causes the package detection sensor on the front side in the traveling direction to detect the rear end of the unloading package W1, to determine whether or not the actual placed position of the unloading package W1 on the shelf 11 is shifted from the predetermined position. The redetermination whether or not the unloading package W1 is shifted from the predetermined position is made with a travel speed lower than that of the usual unloading travel.

If it is redetermined that the actual placed position of the unloading package W1 on the shelf 11 is shifted from the predetermined position, in Steps S112 to S114 the conveyance controller 53 moves the moving cart 7 in the first direction or the second direction by a predetermined distance, similarly to when the measurement result of the width of the unloading package W1 is shifted from the width value indicated in the conveyance command.

Specifically, if the unloading package W1 is placed on the side close to the first direction side end of the shelf 11 ("first direction side" in Step S112), in Step S113 the conveyance controller 53 causes the moving cart 7 to travel from the second direction end side of the unloading package W1 in the second direction by the first distance d1.

On the other hand, if the unloading package W1 is placed on the side close to the second direction side end of the shelf 11 ("second direction side" in Step S112), in Step S114 the conveyance controller 53 causes the moving cart 7 to travel from the first direction end side of the unloading package W1 in the first direction by the distance, which corresponds to the sum of the width value indicated in the information about the width of the unloading package W1 included in the conveyance command and the first distance d1 described above.

The process of moving the moving cart 7 in the first direction or the second direction by the predetermined distance in Steps S112 to S114 described above is the same as the process performed in Steps S101 to S103 in the flowchart of FIG. 9, and detailed description thereof is omitted here.

After executing Steps S111 to S114 to move the moving cart 7 to an appropriate position, in Step S115 the conveyance controller 53 causes the moving cart 7 to perform the unloading travel from this position to the position corresponding to the placed position of the unloading package W1.

To accurately perform the re-measurement of the unloading package W1, the unloading travel performed in Step S115 is performed with a travel speed lower than that of the usual unloading travel performed in Step S3 described above.

During the unloading travel in Step S115, the conveyance controller 53 execute Steps S31 to S37 described above in Step S116, to re-measure the width of the unloading package W1 using the package detection sensor on the front side in the traveling direction.

After performing the re-measurement of the width of the unloading package W1, in Step S117 the conveyance controller 53 adjusts the positions of the first arm 753 and the second arm 755 based on a re-measurement result of the width of the unloading package W1.

Specifically, when the first package detection sensor 78 is on the front side of the moving cart 7 in the traveling direction in the unloading travel, if the difference between the width value indicated in the information about the width of the unloading package W1 included in the conveyance command and the re-measurement result of the width of the unloading package is the first predetermined value or less, and if the placed position of the unloading package W1 is shifted from the predetermined position in the positive direction of the X-axis on the shelf 11, it is determined to shift the stop position of the moving cart 7 for transferring the unloading package W1, from the stop position reference in the positive direction of the X-axis, based on the shift amount of the unloading package W1 from the predetermined position.

The shift amount of the unloading package W1 from the predetermined position can be determined, for example, based on the difference between the position of the first arm 753 (the first package detection sensor 78) when the unloading package W1 is at the predetermined position and the first direction side end is detected by the first package detection sensor 78, and the position of the first arm 753 (the first package detection sensor 78) when the first direction side end of the unloading package W1 is detected by the first package detection sensor 78 in the remeasurement of the width of the unloading package W1.

Figure 15A:
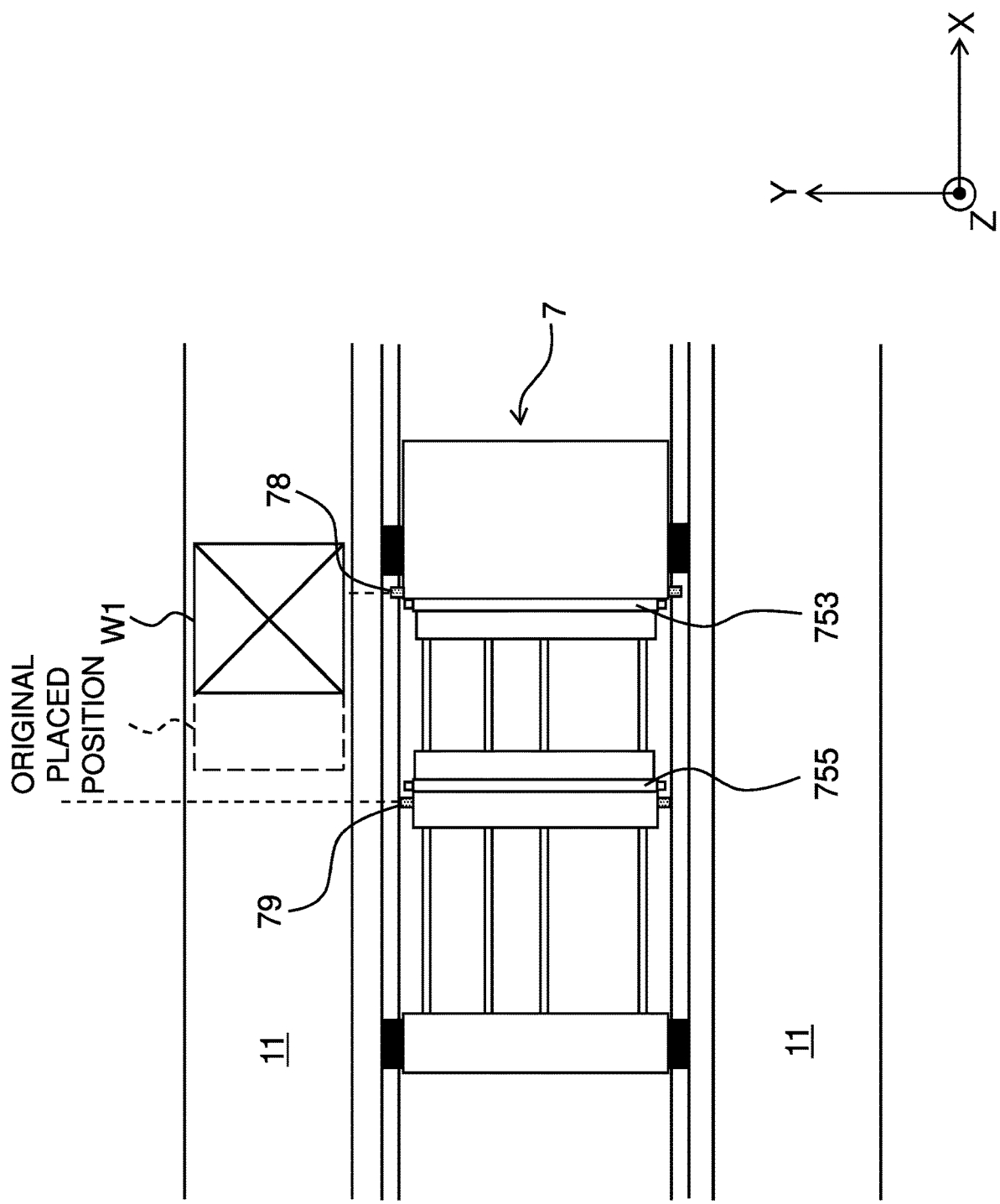
FIG. 15A is a diagram illustrating an example where the unloading package is placed at a position shifted in a positive direction of an X-axis from an original placed position.
Figure 15B:
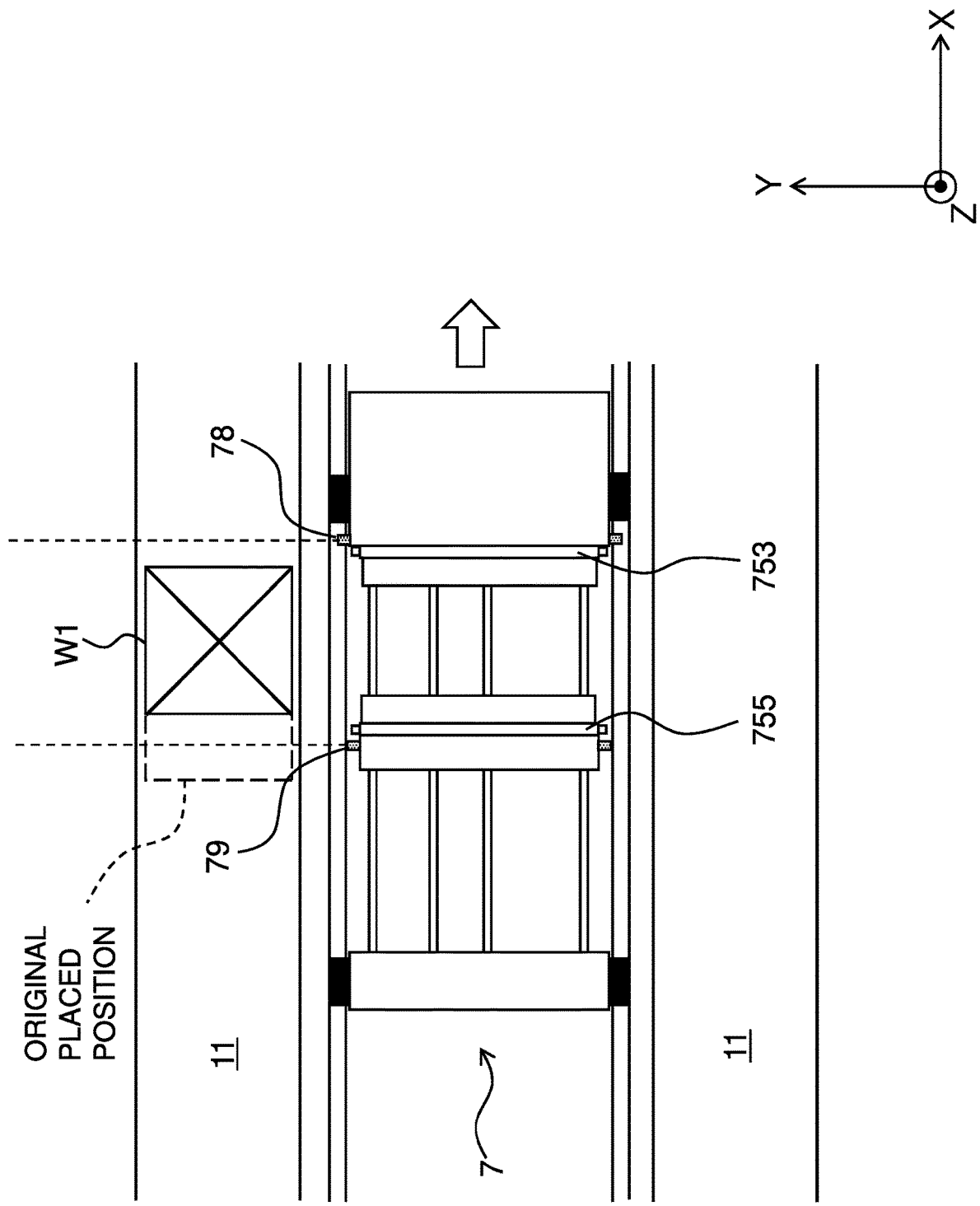
FIG. 15B is a diagram schematically illustrating a method of adjusting positions of the first arm and the second arm when the unloading package is shifted from the original placed position in the positive direction of the X-axis.

For instance, as illustrated in FIG. 15A, it is supposed that the unloading package W1 is shifted from the original placed position in the positive direction of the X-axis, and that the moving cart 7 stops at the position corresponding to the original placed position of the unloading package W1 (a reference stop position) so that the first package detection sensor 78 detects the unloading package W1. Then, as illustrated in FIG. 15B, the conveyance controller 53 causes the moving cart 7 to travel in the positive direction of the X-axis, to the position at which the first package detection sensor 78 becomes unable to detect the unloading package W1, to shift the stop position of the moving cart 7 for the transfer from the reference stop position in the positive direction of the X-axis. FIG. 15A is a diagram illustrating an example of a state where the unloading package W1 is placed at a position shifted from the original placed position in the positive direction of the X-axis. FIG. 15B is a diagram schematically illustrating a method of adjusting the positions of the first arm 753 and the second arm 755 when the unloading package W1 is shifted from the original placed position in the positive direction of the X-axis.

On the other hand, when the second package detection sensor 79 is on the front side of the moving cart 7 in the traveling direction in the unloading travel, if the difference between the information about the width of the unloading package W1 included in the conveyance command and the measurement result of the width of the unloading package is the first predetermined value or less, and if the placed position of the unloading package W1 on the shelf 11 is shifted from the predetermined position in the negative direction of the X-axis, it is determined to shift the position of the second arm 755 on the moving cart 7 for transferring the unloading package W1, from the original position in the negative direction of the X-axis, based on the shift amount of the unloading package W1 from the predetermined position.

Figure 16A:
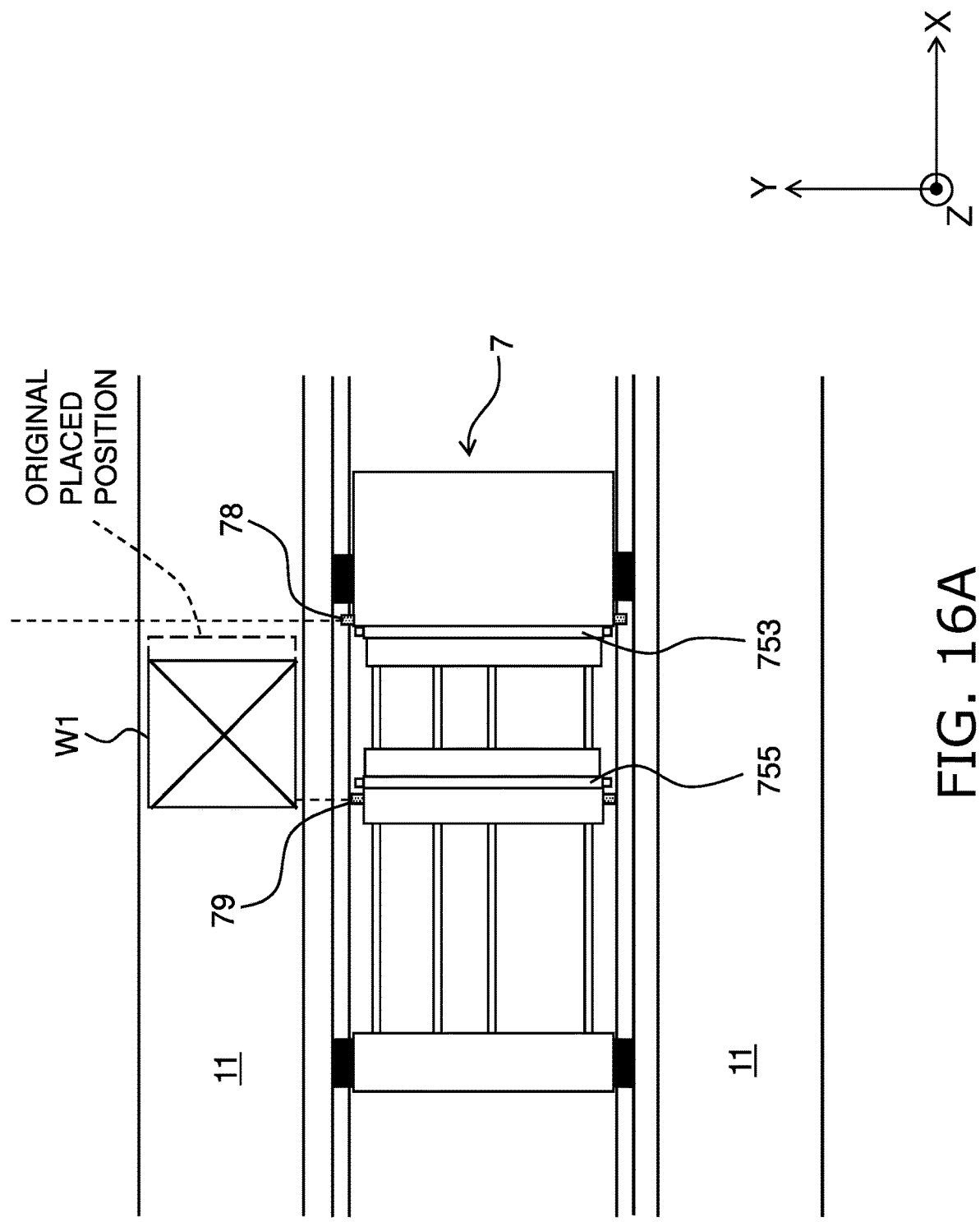
FIG. 16A is a diagram illustrating an example where the unloading package is placed at a position shifted from the original placed position in the negative direction of the X-axis.
Figure 16B:
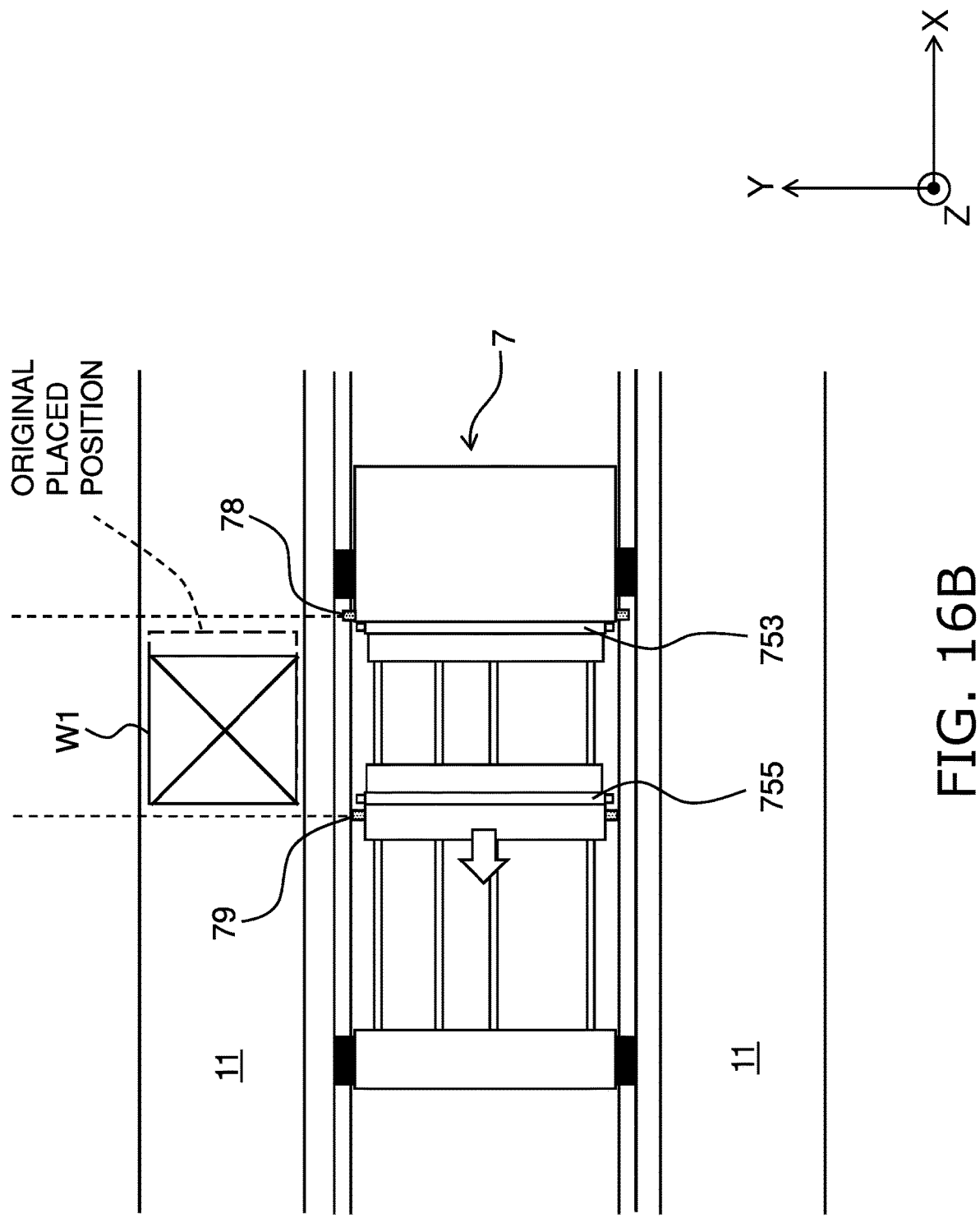
FIG. 16B is a diagram schematically illustrating a method of adjusting the positions of the first arm and the second arm when the unloading package is shifted in the negative direction of the X-axis from the original placed position.

For instance, as illustrated in FIG. 16A, it is supposed that the unloading package W1 is shifted from the original placed position in the negative direction of the X-axis, and that the moving cart 7 stops at the position corresponding to the original placed position of the unloading package W1 so that the second package detection sensor 79 detects the unloading package W1. Then, as illustrated in FIG. 16B, the conveyance controller 53 moves the second arm 755 in the negative direction of the X-axis to the position at which the second package detection sensor 79 becomes unable to detect the unloading package W1, to shift the position of the second arm 755 for the transfer, from the original position in the negative direction of the X-axis. FIG. 16A is a diagram illustrating an example of a state where the unloading package W1 is placed at a position shifted from the original placed position in the negative direction of the X-axis. FIG. 16B is a diagram schematically illustrating a method of adjusting the positions of the first arm 753 and the second arm 755 when the unloading package W1 is shifted from the original placed position in the negative direction of the X-axis.

After adjusting the positions of the first arm 753 and the second arm 755, in Step S118 the conveyance controller 53 executes Steps S6 to S9 described above, to pull in and transfer the unloading package W1 to the moving cart 7 side, while keeping the arm distance between the first arm 753 and the second arm 755 and the positions thereof adjusted in Step S117.

By executing Steps S117 to S118, when the width of the unloading package W1 is within the assumed range but the unloading package W1 is placed at a position shifted from the assumed position in the X direction on the shelf 11, the moving cart 7 (if the shift direction is the positive direction of the X-axis) or the second arm 755 (if the shift direction is the negative direction of the X-axis) is moved to the position, which is determined considering the positional shift of the unloading package W1. And hence, the first arm 753 and the second arm 755 can pull in and transfer the unloading package W1 accurately to the moving cart 7.

In the example described above, if the unloading package W1 is shifted from the assumed position in the negative direction of the X direction, the second arm 755 is moved so that the first arm 753 and the second arm 755 can transfer the unloading package W1. The reason why is that the shift amount in the negative direction of the X direction is small, and the first arm 753 and the second arm 755 can transfer the unloading package W1 without moving the moving cart 7. Therefore, if it is supposed that the hook 753a of the first arm 753 cannot hook the unloading package W1 because the shift amount in the negative direction of the X direction is excessively large, it may be possible to move the moving cart 7 in the negative direction of the X direction so that the distance between the first arm 753 and the unloading package W1 is reduced, and to move the second arm 755 as necessary.

(5) Common Features in Example

The first example commonly has the following structure and function.

The automated warehouse (e.g., the automated warehouse 100) comprises the plurality of shelves (e.g., the shelves 11) and the cart (e.g., the moving cart 7) provided for each shelf to travel in the extending direction of the shelf (e.g., in the X direction) to convey the package (e.g., the package W), and the subordinate controller (e.g., the conveyance controller 53) configured to control the cart. The cart includes the transfer device (e.g., the transfer device 75), the first sensor (e.g., the first package detection sensor 78), and the second sensor (e.g., the second package detection sensor 79).

The transfer device includes the first arm (e.g., the first arm 753) and the second arm (e.g., the second arm 755) configured to transfer the package from and to the shelf.

The first sensor is disposed on the first arm side to detect the package placed on the shelf.

The second sensor is disposed on the second arm side to detect the package placed on the shelf.

In the cart described above, at least one of the first arm and the second arm is configured to move in the extending direction of the shelf with respect to the cart.

In addition, when unloading the package, the subordinate controller configured to perform control including:
  measuring width of the unloading package using the first sensor or the second sensor disposed on a front side of the cart in traveling direction of the unloading travel, when the cart performs the unloading travel to the position corresponding to the placed position of the unloading package (e.g., the unloading package W1) to be unloaded on the shelf;
  moving the first arm and/or the second arm based on the measurement result of the width of the unloading package, to adjust arm distance between the first arm and the second arm to distance larger than the width of the unloading package by the predetermined amount;

and pulling in the unloading package by extending and retracting the first arm and the second arm while keeping adjusted arm distance, after the cart reaches the position corresponding to the placed position of the unloading package.

In the automated warehouse described above, when unloading the package, the subordinate controller measures the width of the unloading package to be unloaded using the sensor disposed on the front side of the cart in the traveling direction, and adjusts the arm distance based on the measurement result to distance larger than the width of the unloading package by the predetermined amount. Furthermore, after the cart reaches the position corresponding to the placed position of the unloading package, the subordinate controller pulls in the unloading package by extending and retracting the first arm and the second arm while keeping the adjusted arm distance.

In this way, the arm distance is set before the cart reaches the transferring position, and afterward the arm distance is not changed. Therefore, it is possible to reduce the time necessary for transferring the package after stopping the cart. This is because, in the conventional method, when unloading the unloading package, the arms are moved to sandwich the unloading package, and further the arms are moved again to secure a clearance between the package and the arm, but these operations are unnecessary.

2. Other Examples

Although one example is described above, this disclosure is not limited to the example described above, but can be variously modified within the scope of the disclosure without deviating from the spirit thereof. In particular, the plurality of example and variations described in this specification can be arbitrarily combined as necessary.

(A) The process contents of each step, and/or the execution order of the steps in the flowchart of FIG. 5, 7, 9, or 13 can be appropriately modified within the scope of the disclosure without deviating from the spirit thereof.

(B) In the transfer device 75 described in the first example, the first arm 753 is not configured to move in the X direction on the front side of the moving cart 7, while the second arm 755 is configured to move in the X direction on the rear side of the moving cart 7. Without limiting to this, however, both the first arm 753 and the second arm 755 may be configured to move in the X direction.

(C) In the first example described above, the position of the moving cart 7 in the X direction is grasped based on the detection result of the slit provided to the rails 7a and the measurement result of the rotation amount of the wheels 731 using the first rotation amount measuring sensor 731b. Without limiting to this, however, the position of the moving cart 7 in the X direction may be grasped, for example, based on identification information indicated by a barcode provided along the X direction, a measurement result of a distance between a predetermined reference position (e.g., an end of rails 7a in the X direction) and the moving cart 7 using a distance sensor, or the like.

(D) In the first example described above, the position of the second arm 755 on the moving cart 7 is grasped based on the measurement result of the rotation amount of the ball screw 76 using the second rotation amount measuring sensor 751b. Without limiting to this, however, the position of the second arm 755 on the moving cart 7 may be grasped, for example, based on identification information indicated by a barcode provided to the moving cart 7, a measurement result of a distance between a predetermined reference position of the moving cart 7 (e.g., an end of the first main body part 73a and/or the second main body part 73b) and the second arm 755 using a distance sensor, or the like.

(E) In the first example described above, if the unloading package W1 is shifted from the predetermined placed position in the negative direction of the X-axis, the second arm 755 is moved according to the shift of the unloading package W1 so that the position of the second arm 755 is adjusted. Without limiting to this, however, similarly to when the unloading package W1 is shifted from the predetermined placed position in the positive direction of the X-axis (on the first package detection sensor 78 side), it may be possible to cause the moving cart 7 to travel according to the shift of the unloading package W1, to adjust the positions of the first arm 753 and the second arm 755.

(F) If the difference between the width value indicated in the information about the width of the unloading package W1 and the measurement result of the width of the unloading package W1 is larger than the first predetermined value (i.e., if the unloading package W1 is larger than a supposed size), and if the placed position of the unloading package W1 is shifted from the predetermined position in the X direction on the shelf 11, it may be possible to perform both the retrying operation (Steps S101 to S109) when the measurement result of the width of the unloading package W1 is shifted from the width value indicated in the conveyance command, and the retrying operation (Steps S111 to S118) when a package shift is detected.

(G) If it is determined in Step S5 that the actual placed position of the unloading package W1 on the shelf 11 is shifted from the predetermined position, it may be possible to promptly move the moving cart 7 in the first direction or the second direction by a predetermined distance, without re-determining whether or not the unloading package W1 is shifted from the predetermined position.

INDUSTRIAL APPLICABILITY

My concepts and methods can be widely applied to automated warehouses including a plurality of shelves, and a cart having a transfer device for transferring a package from and to the shelf.

The invention claimed is:

1. An automated warehouse comprising a plurality of shelves, a cart provided for each of the shelves to travel in an extending direction of the shelf to convey a package, and a subordinate controller configured to control the cart, wherein the cart includes a transfer device having a first arm and a second arm configured to transfer a package from and to the shelf, a first sensor disposed on the first arm side to detect the package placed on the shelf, and a second sensor disposed on the second arm side to detect the package placed on the shelf, at least one of the first arm and the second arm is configured to move in the extending direction of the shelf on the cart, and when unloading the package, the subordinate controller is configured to perform control including:

measuring, during travel, a width of an unloading package to be unloaded using the first sensor or the second sensor disposed on a front side of the cart in a traveling direction of unloading travel, when the cart performs the unloading travel to a position corresponding to a placed position of the unloading package on the shelf;

moving, during travel, the first arm and/or the second arm based on a measurement result of the width of the unloading package, to adjust an arm distance between the first arm and the second arm to a distance larger than the width of the unloading package by a predetermined amount; and pulling in the unloading package by extending and retracting the first arm and the second arm while keeping an adjusted arm distance, after the cart reaches the position corresponding to the placed position of the unloading package;

wherein the second arm is movable in the extending direction of the shelf, the second sensor is provided to the second arm, and when performing the unloading travel, if the second sensor is on the front side of the cart in the traveling direction, the subordinate controller is configured to measure the width of the unloading package, based on information about a cart position and information about a second arm position on the cart when the package is detected.

2. The automated warehouse according to claim 1, further comprising a host controller configured to send to the subordinate controller a conveyance command including information about the width of the unloading package, wherein when starting the unloading travel, the subordinate controller is configured to control adjusting the arm distance to a first distance larger than a value indicated in the information about the width of the unloading package, included in the conveyance command, by a predetermined amount, and then adjusting the arm distance to distance larger than the width of the unloading package indicated in the measurement result by a predetermined amount, from the state where the arm distance is adjusted to the first distance.

3. The automated warehouse according to claim 2, wherein the second arm is movable in the extending direction of the shelf, the second sensor is provided to the second arm, when performing the unloading travel, if the second sensor is on the front side of the cart in the traveling direction, the subordinate controller is configured to measure the width of the unloading package, based on information about cart position and information about second arm position on the cart.

4. The automated warehouse according to claim 1, wherein, when performing the unloading travel, if the first sensor is on the front side of the cart in the traveling direction, if a difference between information about the width of the unloading package included in the conveyance command and measurement result of the width of the unloading package is a first predetermined value or less, and if the placed position of the unloading package on the shelf is shifted from a predetermined position in the extending direction of the shelf, the subordinate controller is configured to determine a stop position of the cart based on a shift amount of the unloading package from the predetermined position.

5. The automated warehouse according to claim 1, wherein, when performing the unloading travel, if the second sensor is on the front side of the cart in the traveling direction, if a difference between information about the width of the unloading package included in the conveyance command and measurement result of the width of the unloading package is a first predetermined value or less, and if the placed position of the unloading package on the shelf is shifted from a predetermined position in the extending direction of the shelf, the subordinate controller is configured to determine the second arm position on the cart based on a shift amount of the unloading package from the predetermined position.

6. The automated warehouse according to claim 1, wherein, if a difference between information about the width of the unloading package included in the conveyance command and measurement result of the width of the unloading package is larger than a first predetermined value, the subordinate controller is configured to control the cart to perform re-measurement of the width of the unloading package.

7. An automated warehouse comprising a plurality of shelves, a cart provided for each of the shelves to travel in an extending direction of the shelf to convey a package, and a subordinate controller configured to control the cart, wherein the cart includes a transfer device having a first arm and a second arm configured to transfer a package from and to the shelf, a first sensor disposed on the first arm side to detect the package placed on the shelf, and a second sensor disposed on the second arm side to detect the package placed on the shelf, at least one of the first arm and the second arm is configured to move in the extending direction of the shelf on the cart, and when unloading the package, the subordinate controller is configured to perform control including:

measuring a width of an unloading package to be unloaded using the first sensor or the second sensor disposed on a front side of the cart in a traveling direction of unloading travel, when the cart performs the unloading travel to a position corresponding to a placed position of the unloading package on the shelf;

moving the first arm and/or the second arm based on a measurement result of the width of the unloading package, to adjust an arm distance between the first arm and the second arm to a distance larger than the width of the unloading package by a predetermined amount; and pulling in the unloading package by extending and retracting the first arm and the second arm while keeping an adjusted arm distance, after the cart reaches the position corresponding to the placed position of the unloading package, wherein the first arm is fixed to the cart on a first direction side that is one side in the extending direction of the shelf, and when performing re-measurement of the width of the unloading package placed on the side closer to the first direction end of the shelf than a second direction side end that is the other side end in the extending direction of the shelf, the subordinate controller is configured to cause the cart to travel a first distance in the second direction from a second direction end side of the unloading package opposite to the first direction.

8. The automated warehouse according to claim 7, wherein the first distance corresponds to a distance at which the first sensor exists on the second direction side of the second direction side end of the unloading package when the cart is moved in the second direction.

9. The automated warehouse according to claim 7, wherein the second arm is provided to the cart at the second direction side end in a movable manner in the extending direction of the shelf, and
  when performing re-measurement of the width of the unloading package placed on the side close to the second direction end of the shelf, the subordinate controller is configured to cause the cart to travel a sum of the information about the width of the unloading package included in the conveyance command and the first distance, from the first direction end side of the unloading package in the first direction.

10. The automated warehouse according to claim 8, wherein the second arm is provided to the cart at the second direction side end in a movable manner in the extending direction of the shelf, and
  when performing re-measurement of the width of the unloading package placed on the side close to the second direction end of the shelf, the subordinate controller is configured to cause the cart to travel a sum of the information about the width of the unloading package included in the conveyance command and the first distance, from the first direction end side of the unloading package in the first direction.

\* \* \* \* \*